(12) United States Patent
Moribe et al.

(10) Patent No.: US 10,506,135 B2
(45) Date of Patent: Dec. 10, 2019

(54) COLOR CONVERSION LOOK-UP TABLE GENERATING DEVICE, COLOR CONVERSION LOOK-UP TABLE CORRECTION METHOD, AND STORAGE MEDIUM

(71) Applicant: CANON KABUSHIKI KAISHA, Tokyo (JP)

(72) Inventors: Shoei Moribe, Tokyo (JP); Takashi Ochiai, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/968,183

(22) Filed: May 1, 2018

(65) Prior Publication Data

US 2018/0324327 A1 Nov. 8, 2018

(30) Foreign Application Priority Data

May 2, 2017 (JP) .................. 2017-091872

(51) Int. Cl.
*H04N 1/60* (2006.01)
*G09G 5/06* (2006.01)
(Continued)

(52) U.S. Cl.
CPC ............ *H04N 1/6019* (2013.01); *G09G 5/06* (2013.01); *H04N 1/60* (2013.01); *H04N 1/6013* (2013.01);
(Continued)

(58) Field of Classification Search
CPC .................................................. H04N 1/6019
(Continued)

(56) References Cited

U.S. PATENT DOCUMENTS

| 7,773,252 B2 * | 8/2010 | Yoshida | H04N 1/6033 358/1.9 |
| 2007/0291312 A1 | 12/2007 | Kaneko et al. | |

(Continued)

FOREIGN PATENT DOCUMENTS

| JP | 2006-197080 A | 7/2006 |
| WO | 2017017942 A1 | 2/2017 |

OTHER PUBLICATIONS

Extended European Search report issued in corresponding EP Application No. 18170031.1 dated Sep. 26, 2018, 12 pages.

*Primary Examiner* — Jacky X Zheng

(74) *Attorney, Agent, or Firm* — Carter, DeLuca & Farrell LLP

(57) ABSTRACT

A color conversion look-up table generating device of the present invention includes a converting unit configured to convert an actual color material value of a target grid point in the color conversion look-up table and an actual color material value of a neighbor grid point of the target grid point into virtual color material values, and a correcting unit that corrects the actual color material value of the target grid point on the basis of a virtual color material amount of the target grid point and a virtual color material amount of the neighbor grid point, wherein the virtual color material value is an output value of a virtual color material that absorbs only light of spectral reflectance in each of divided blocks in a case in which spectral reflectance of the actual color material is divided into n (n is an integer of 3 or more) blocks.

19 Claims, 21 Drawing Sheets

(51) Int. Cl.
*H04N 1/58* (2006.01)
*H04N 1/407* (2006.01)

(52) U.S. Cl.
CPC ......... *H04N 1/6027* (2013.01); *H04N 1/6033* (2013.01); *H04N 1/407* (2013.01); *H04N 1/58* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2008/0018962 A1* | 1/2008 | Kawai | H04N 1/6019 358/522 |
| 2008/0259359 A1* | 10/2008 | Tamura | H04N 1/40068 358/1.1 |
| 2014/0253931 A1* | 9/2014 | Hashizume | H04N 1/50 358/1.9 |
| 2017/0324885 A1 | 11/2017 | Ochiai et al. | |
| 2018/0295258 A1* | 10/2018 | Ochiai | H04N 1/6025 |

\* cited by examiner

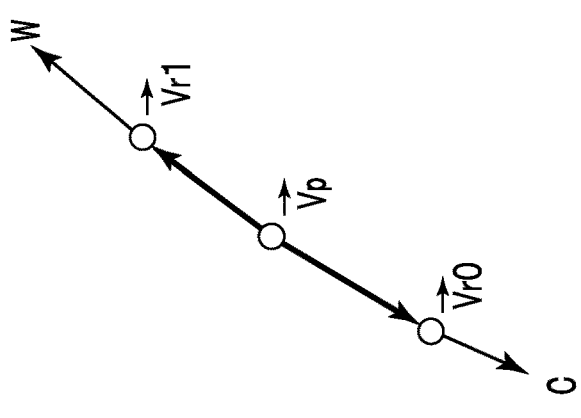

FIG.10C $E = |\overrightarrow{(Vr1-Vp)} + \overrightarrow{(Vr0-Vp)}| / |\overrightarrow{Vr1-Vr0}|$
$+ |\overrightarrow{(Vg1-Vp)} + \overrightarrow{(Vg0-Vp)}| / |\overrightarrow{Vg1-Vg0}|$
$+ |\overrightarrow{(Vb1-Vp)} + \overrightarrow{(Vb0-Vp)}| / |\overrightarrow{Vb1-Vb0}|$

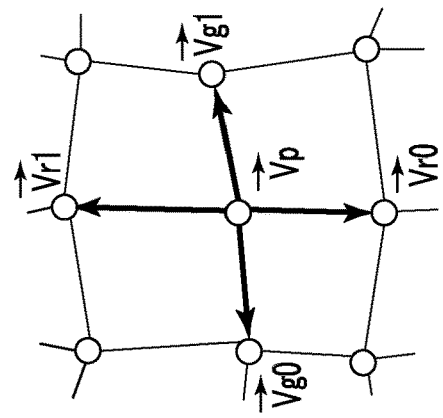

FIG.10B $E = |\overrightarrow{(Vr1-Vp)} + \overrightarrow{(Vr0-Vp)}| / |\overrightarrow{Vr1-Vr0}|$
$+ |\overrightarrow{(Vg1-Vp)} + \overrightarrow{(Vg0-Vp)}| / |\overrightarrow{Vg1-Vg0}|$

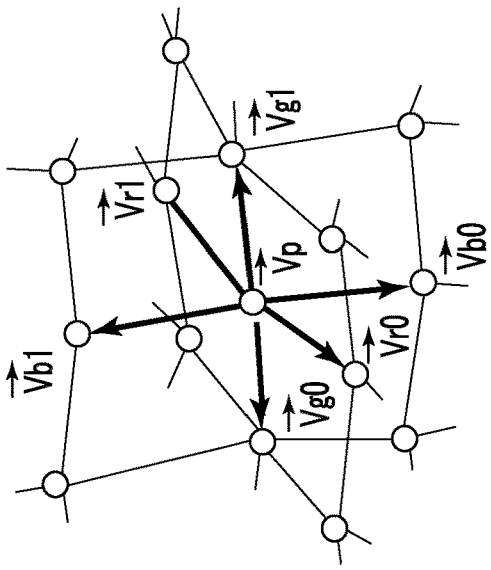

FIG.10A $E = |\overrightarrow{(Vr1-Vp)} + \overrightarrow{(Vr0-Vp)}| / |\overrightarrow{Vr1-Vr0}|$

COLOR CONVERSION LOOK-UP TABLE GENERATING DEVICE, COLOR CONVERSION LOOK-UP TABLE CORRECTION METHOD, AND STORAGE MEDIUM

BACKGROUND OF THE INVENTION

Field of the Invention

The present invention relates to a color conversion look-up table generating device, a color conversion look-up table correction method, and the like which are used in a color conversion process of converting an input image signal value into a plurality of types of actual color material values.

Description of the Related Art

A printer represented by an ink jet system converts an input image signal (usually, color signals of three channels of RGB) into a color material amount signal indicating an output amount of a color material (for example, CMYK ink) installed in the printer and generates print data. The conversion is called a color conversion process or a color separation process, and a system in which the input image signal is associated with the color material amount signal using a three-dimensional look-up table (hereinafter referred to as an "LUT") has currently become the main stream. According to a method of generating a general color separation LUT, only a color material amount value corresponding to a main input image signal value is set by an LUT designer, and color material amount values corresponding to the other input image signal values are calculated through an interpolation calculation.

Japanese Patent Laid-Open No. 2006-197080 discloses a method of correcting an arrangement of grid points in a color separation LUT in order to improve the accuracy of the interpolation calculation. According to the method of correcting the color separation LUT disclosed in Japanese Patent Laid-Open No. 2006-197080, grid point positions in the color separation LUT are converted into coordinates (Lab values) in an L*a*b*color space, and the Lab values are smoothed in the L*a*b color space. Further, the arrangement of the grid points in the color separation LUT is corrected on the basis of the smoothed Lab value.

SUMMARY OF THE INVENTION

The present invention aims to provide a technique that further improves a gradation property implemented by a color conversion look-up table.

According to the present invention, a color conversion look-up table generating device used in a color conversion process of converting an input image signal value into a plurality of types of actual color material values includes an acquiring unit that converts the actual color material values of a target grid point into virtual color material values in the color conversion look-up table; and a correcting unit that corrects the actual color material value of the target grid point on the basis of a virtual color material amount of the target grid point and an actual color material amount of the neighbor grid point, in which the virtual color material value is an output value of a virtual color material that absorbs only light of spectral reflectance in each of divided blocks in a case in which spectral reflectance of the actual color material is divided into n (n is an integer of 3 or more) blocks.

Further features of the present invention will become apparent from the following description of exemplary embodiments with reference to the attached drawings.

BRIEF DESCRIPTION OF THE DRAWINGS

FIGS. 10A to 10C are diagrams for describing a method of calculating an evaluation value in the first embodiment;

DESCRIPTION OF THE EMBODIMENTS

In the color separation LUT correction method disclosed in Japanese Patent Laid-Open No. 2006-197080, since the Lab value and the color material amount value associated with the Lab value are not necessarily in a linear relation, although the Lab value is smoothed, there are cases in which a gradation property implemented by the color separation LUT is not satisfactory. In a case in which a gradation region is included in a printed material and a change of a color material amount value with respect to an input image signal value is not smooth, a defect such as a pseudo contour is likely to occur in the gradation region.

Hereinafter, modes for carrying out the present invention will be described with reference to the appended drawings. However, constituent elements described in embodiments are merely examples, and the scope of the present invention is not intended to be limited thereto.

First Embodiment (Overall Configuration of Printing System)

Figure 1:
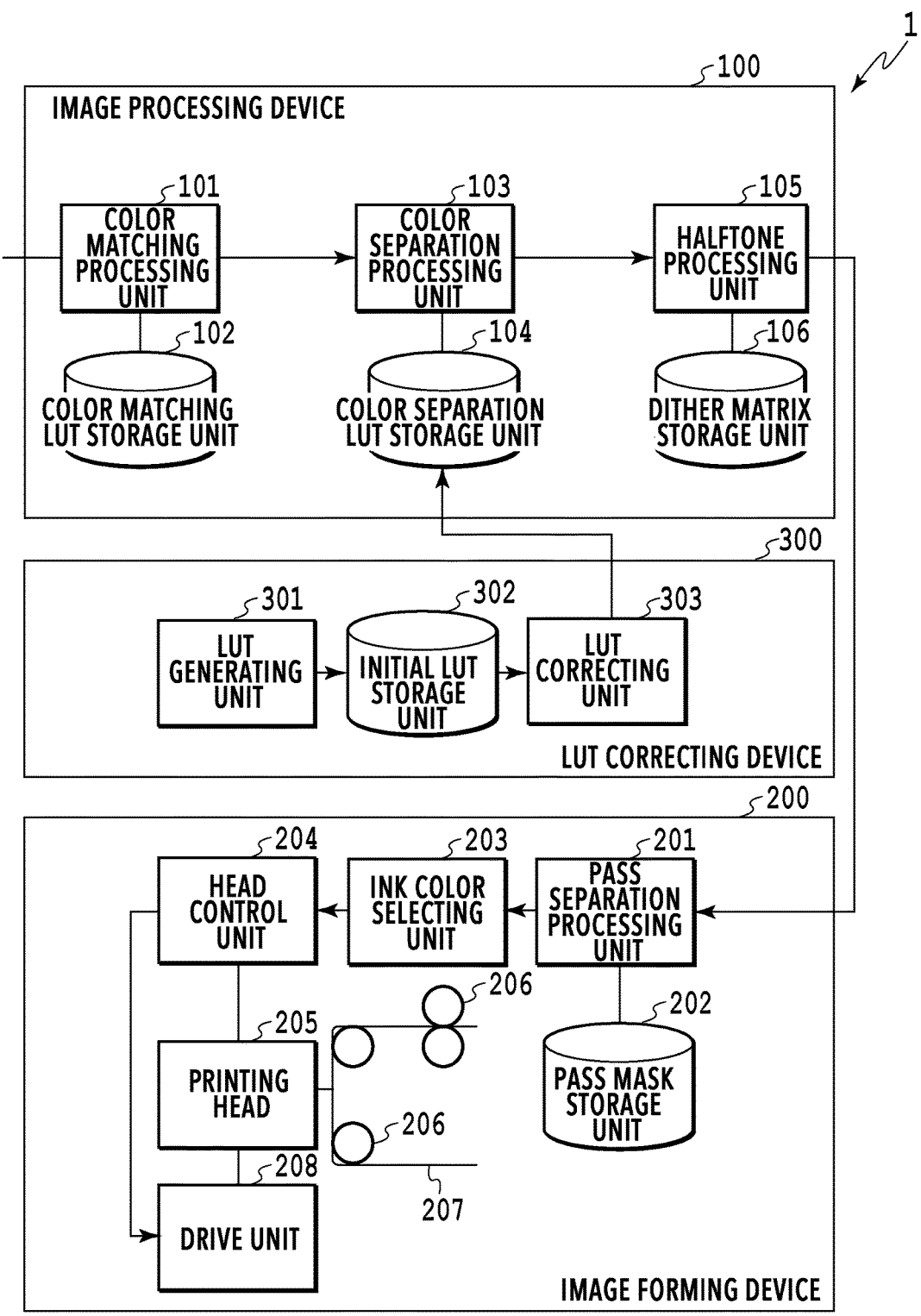
FIG. 1 is a block diagram illustrating an overall configuration example of a printing system in a first embodiment.

FIG. 1 is a block diagram illustrating an overall configuration example of a printing system 1 in the present embodiment. The printing system 1 of the present embodiment includes an image processing device 100, an image forming device 200, and an LUT correcting device 300. The image processing device 100, the image forming device 200, and the LUT correcting device 300 are connected to be able to communicate with one another via a printer interface (hereinafter also referred to as an "I/F"), a circuit, or a network I/F.

The image processing device 100 in the present embodiment can be implemented by a printer driver installed in a general information processing device (a personal computer). Alternatively, in another configuration example of the image processing device 100, the image forming device 200 may include the image processing device 100 therein. The image processing device 100 receives an input of image data indicating an image of a printing target and transfers image data to the color matching processing unit 101. The image data is, for example, color image data based on an 8-bit RGB image signal.

The color matching processing unit 101 performs a color matching process on the input image data and corrects a color of the RGB image. With the color matching process, it is possible to reproduce a unified color tint even in a case where a printer or a printing medium having a different color reproduction characteristic is used. A three-dimensional color matching LUT stored in a color matching LUT storage unit 102 is referred to in a case where the color matching process is performed. In the color matching LUT, RGB signal values of 8 bits (0 to 255) are held at grid points thinned out to 17×17×17. The RGB signal value between the grid points is calculated by linear interpolation.

A color separation processing unit 103 receives an input of the image data corrected by the color matching processing unit 101 and generates ink value image data corresponding to a plurality of types of ink amounts (ink values) installed in the image forming device 200. In the present embodiment, the image forming device 200 has inks of 6 colors installed therein, and a color separation processing unit 103 generates 6-plane 8-bit ink value image data. In the present embodiment, the inks of the six colors installed in the image forming device 200 may be cyan (C), magenta (M), yellow (Y), black (K), light cyan (Lc), and light magenta (Lm) but may be a combination of other inks. The color separation processing unit 103 performs a color separation process on the image data which has undergone the color matching process with reference to the color separation LUT stored in a color separation LUT storage unit 104. The color separation LUT is a three-dimensional LUT having 9×9×9 grid points, and ink values (actual color material values) indicating output amounts of the inks of the six colors are held at the grid points of the color separation LUT. The color separation processing unit 103 calculates the ink value between the grid points through the linear interpolation with reference to the color separation LUT. A method of designing the color separation LUT in the present embodiment will be described later.

A halftone processing unit 105 carries out a quantization process of converting the ink value image data of each color output from the color separation processing unit 103 into a binary value (or a multiple value of a gradation number which is a binary value or more and smaller than an input gradation number). In the present embodiment, a known dither matrix method is selected as a method of performing a halftone process. The halftone processing unit 105 of the present embodiment performs the quantization process with reference to the dither matrix stored in a dither matrix storage unit 106. Here, the halftone process method is not limited to this example, and for example, a known error diffusion method may be used. The binary image data generated by the halftone processing unit 105 is output to the image forming device 200 via an output I/F or an output terminal.

The image forming device 200 forms an image indicated by the binary image data formed by the image processing device 100 on a printing medium 207 by moving a printing head 205 lengthwise and crosswise relative to the printing medium 207 such as cut paper. In the present embodiment, an example in which the image forming device 200 is a printer of an ink jet system including the printing head 205 will be described. The printing head 205 includes a plurality of printing elements (nozzles). The printing head 205 of the present embodiment is equipped with ink tanks of six colors of C, M, Y, K, Lc, and Lm. A head control unit 204 controls an operation of a drive unit 208. The drive unit 208 moves the printing head 205 under the control of the head control unit 204. The head control unit 204 also controls an operation of a conveying unit 206. The conveying unit 206 conveys a printing medium 207 under the control of the head control unit 204. In the present embodiment, the printing head 205 scans the printing medium 207 twice or more and forms an image. Such an image forming method is referred to as a "so-called multipath printing method." A pass separation processing unit 201 generates scan data of each color on the basis of the binary image data of each color generated by the image processing device 100 and a pass mask acquired from a pass mask storage unit 202. Further, the scan data is data indicating a pattern in which a nozzle group divided into two or more performs printing in each printing scan. The patterns are a complementary relation, and in a case where the patterns of all the nozzle groups are superimposed on one another, image forming in all regions is completed. Each time the printing scan is completed, the printing medium 207 is conveyed by a width of the nozzle group. On the basis of the generated scan data, an ink color selecting unit 203 selects the ink color from among the ink colors loaded into the printing head 205, and the selected ink is ejected onto the printing medium 207 through the printing element (nozzle).

Next, the LUT correcting device 300 will be described. The LUT correcting device 300 of the present embodiment is implemented by a general information processing device (a personal computer). An LUT generating unit 301 generates an initial color separation LUT serving as a correction target. The initial color separation LUT of the present embodiment is a three-dimensional color separation LUT in which, for example, 256×256×256 grid points are included, and intervals of the grid points are equal. An initial LUT storage unit 302 stores an initial color separation LUT serving as the correction target. An LUT correcting unit 303 corrects the initial color separation LUT stored in the initial LUT storage unit 302. Alternatively, an existing color separation LUT stored in the color separation LUT storage unit 104 may be read out and the read color separation LUT may be corrected. The LUT correction method will be described in detail later.

(Hardware Configuration of LUT Correcting Device)

Figure 2:
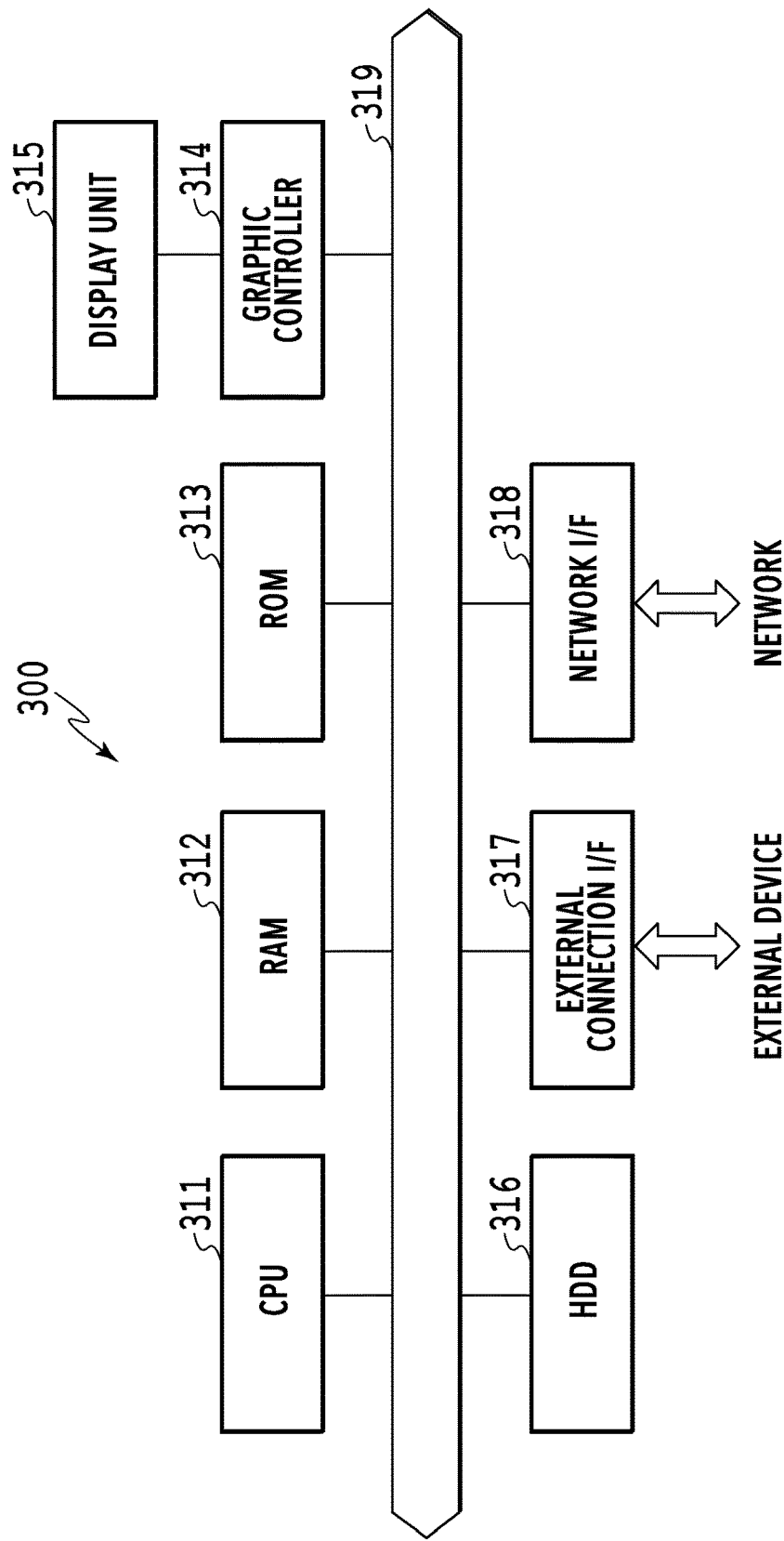
FIG. 2 illustrates an example of a hardware configuration of an information processing device in the first embodiment.

FIG. 2 is a block diagram illustrating an example hardware configuration of the LUT correcting device 300 in the present embodiment. The LUT correcting device 300 includes a CPU 311, a RAM 312, a ROM 313, a graphic controller 314, a display unit 315, and a hard disk drive (HDD) 316. The LUT correcting device 300 further includes an external connection I/F 317 and a network I/F 318, and the respective components are connected to be able to communicate with one another via a bus 319. The CPU 311 includes an operation circuit and controls the LUT correcting device 300 in general. The CPU 311 reads a program stored in the ROM 313 or the HDD 316 out to the RAM 312 and executes various kinds of processes. The ROM 313 stores a system program and the like used for controlling the LUT correcting device 300. The graphic controller 314 generates a screen to be displayed on the display unit 315. The HDD 316 has a function as a storage region and stores an application program and the like for executing various kinds of processes. The HDD 316 is an example of a storage device and can be constituted by a solid state drive (SSD) or the like instead of an HDD. The external connection I/F 317 is an interface for connecting various devices to the LUT correcting device 300. For example, the image processing device 100, a display, a keyboard, a mouse, and the like can be connected via the external connection I/F 317. The network I/F 318 communicates with the image processing device 100 or the like via a network under the control of the CPU 311. The hardware configuration of the LUT correcting device 300 illustrated in FIG. 2 is a general configuration of an information processing device. Therefore, the image processing device 100 can also be implemented by an information processing device having the hardware configuration illustrated in FIG. 2.

(Image Forming Procedure)

Figure 3:
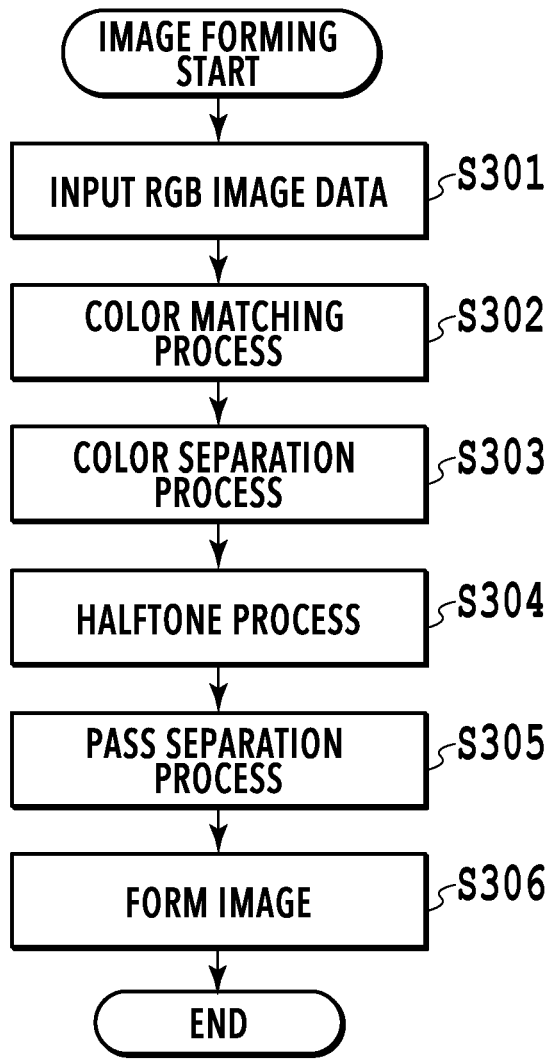
FIG. 3 is a flowchart illustrating an image forming procedure in the first embodiment.

FIG. 3 is a flowchart illustrating a series of processes until the image forming device 200 outputs an image after the image processing device 100 receives an input of image data in the present embodiment. A process of the flowchart illustrated in FIG. 3 is executed by a circuit such as an ASIC mounted on the image processing device 100 and the image forming device 200. Reference signal S below indicates steps in the flowchart. The same applies to flowcharts of FIG. 3 and subsequent drawings.

In S301, RGB image data is input via the external connection I/F of the image processing device 100.

In S302, the color matching processing unit 101 performs the color matching process of the RGB image data input in S301 with reference to the three-dimensional color matching LUT.

In S303, the color separation processing unit 103 generates ink value image data from the image data converted in the color matching process. The color separation processing unit 103 performs the color separation process with reference to the three-dimensional color separation LUT stored in the color separation LUT storage unit 104.

In S304, the halftone processing unit 105 converts the ink value image data which has undergone the color separation process into binary image data. The binary image data is output to the image forming device 200 with an arbitrary size such as the entire image or a bandwidth of each unit printing region.

In S305, the pass separation processing unit 201 converts the binary image data received from the image processing device 100 into scan data.

In S306, the ink color selecting unit 203 selects an ink color suitable for the scan data. The printing head 205 drives each nozzle corresponding to the selected ink color at constant intervals while moving relative to the printing medium 207. The printing medium 207 is conveyed by a predetermined amount for each movement (scanning) of the printing head 205. The driving of the printing head 205 and the conveying of the printing medium 207 are repeated, and thus an image is formed on the printing medium 207. In a case where image forming (S306) is completed, the process of the present flowchart ends.

(Virtual Color Material Amount)

Here, before the technique of correcting the color separation LUT is described, the virtual color material amount will be described. In the present embodiment, the virtual color material is assumed to be color materials of three colors, that is, yellow, magenta, and cyan which are three primary colors of a subtractive color mixture. Here, values obtained by dividing a spectral reflectance Ref($\lambda$) into n wavelength blocks and averaging the spectral reflectances in the respective wavelength blocks are defined as block reflectances Ref1, Ref2, . . . , and Refn. Further, the logarithms of the block reflectance Ref1, Ref2, . . . Refn are defined as block densities. Specifically, values D1, D2, . . . , and Dn obtained by converting the block reflectances Ref1, Ref2, . . . , and Refn using the following Formula (1) are defined as block densities.

$$D = -\log 10(\text{Ref}) \quad \text{Formula (1)}$$

In the present embodiment, the spectral reflectance Ref($\lambda$) is divided into three wavelength blocks corresponding to wavelength bands of light mainly absorbed by the color materials of the three colors. At this time, the block density corresponding to the wavelength band (380 nm to 480 nm) mainly absorbed by the yellow ink is indicated by Dy. Similarly, the block density corresponding to the wavelength band (480 nm to 580 nm) mainly absorbed by the magenta ink is indicated by Dm, and the block density corresponding to the wavelength band (580 nm to 730 nm) mainly absorbed by the cyan ink is indicated by Dc. The virtual color materials having ideal spectral reflectances Refyi($\lambda$), Refmi($\lambda$), and Refci($\lambda$) corresponding to the block densities Dy, Dm, and Dc are defined as yi, mi, and ci.

Figure 4A:
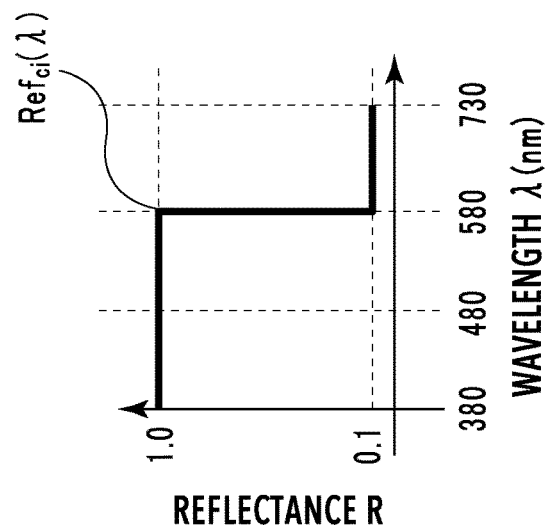
FIGS. 4A to 4C are graphs illustrating an example of spectral reflectance in the first embodiment.
Figure 4B:
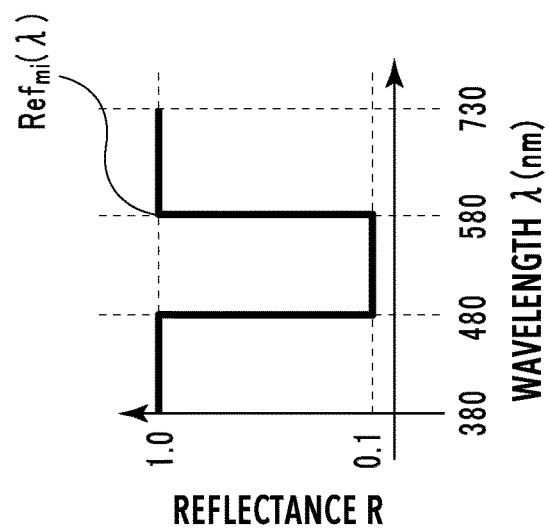
Figure 4C:
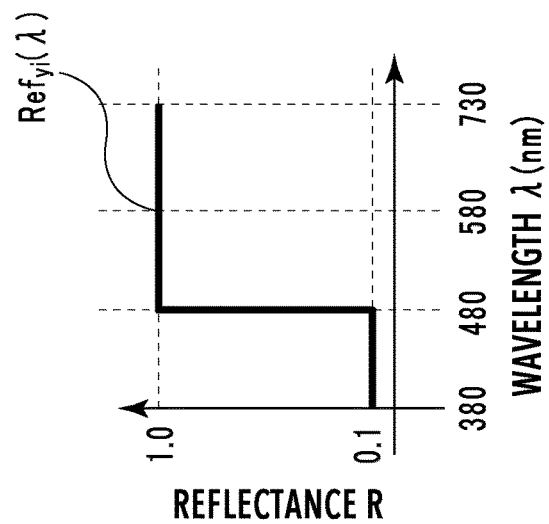

FIGS. 4A to 4C are graphs illustrating the spectral reflectances of the virtual color materials. FIG. 4A illustrates that the virtual color material yi absorbs only light of the wavelength band (380 nm to 480 nm) mainly absorbed by the yellow ink and reflects light of wavelengths other than the wavelength band 100%. FIG. 4B illustrates that the virtual color material mi absorbs only light of the wavelength band (480 nm to 580 nm) mainly absorbed by the magenta ink and reflects light of wavelengths other than the wavelength band 100%. FIG. 4C illustrates that the virtual color material ci absorbs only light of the wavelength band (580 nm to 730 nm) mainly absorbed by the cyan ink and reflects light of wavelengths other than the wavelength band 100%.

Figure 5C:
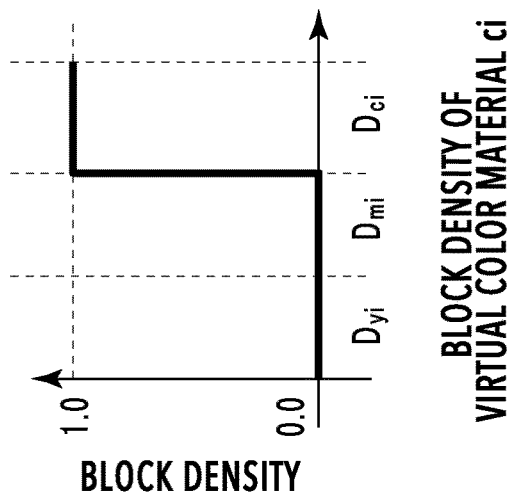
FIGS. 5A to 5C are graphs illustrating an example of a block density in the first embodiment.
Figure 5B:
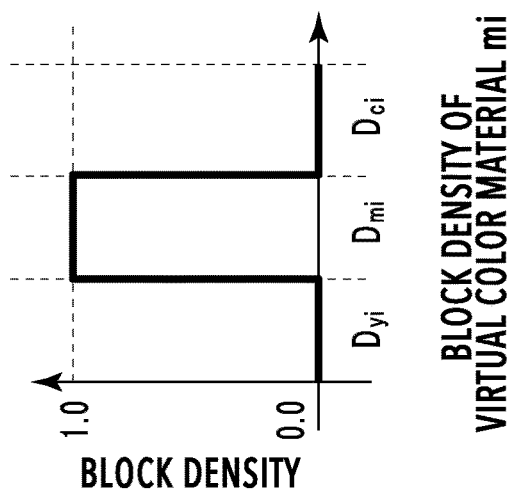
Figure 5A:
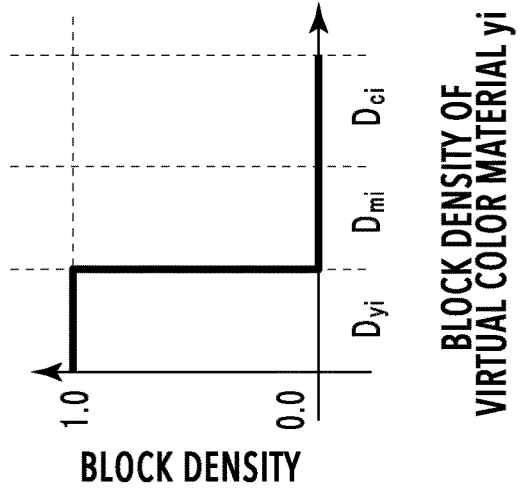

As described above, the block densities Dyi, Dmi, and Dci of the virtual color materials yi, mi, and ci are obtained by using Formula (1) above. For example, the reflectances of the wavelength bands mainly absorbed by the virtual color materials yi, mi, and ci are assumed to be 10%. At this time, the block density Dyi of the virtual color material yi is assumed to be 1.0, Dmi is assumed to be 0.0, and Dci is assumed to be 0.0 (see FIG. 5A). Similarly, the block density Dyi of the virtual color material mi is assumed to be 0.0, Dmi is assumed to be 1.0, and Dci is assumed to be 0.0, and regarding the block density Dci of the virtual color material ci, Dyi is assumed to be 0.0, Dmi is assumed to be 0.0, and Dci is assumed to be 1.0 (see FIGS. 5B and 5C).

Incidentally, it is already known as Lambert's law that the color material amount (thickness of a color material) is proportional to an optical density within a range in which light scattering can be ignored. In a case where this rule always holds for the virtual color materials yi, mi, and ci on the printing medium, the block density of each of yi, mi and ci is proportional to the color material amount per unit area on the printing medium. In other words, it is possible to perform mutual linear conversion of arbitrary block densities Dy, Dm, and Dc and the virtual color material amounts Vyi, Vmi, and Vci [%] in accordance with the following Formulas (2-1) to (2-3).

$$Vyi=(Dy/Dyi)\times\alpha \qquad \text{Formula (2-1)}$$

$$Vmi=(Dm/Dmi)\times\alpha \qquad \text{Formula (2-2)}$$

$$Vci=(Dc/Dci)\times\alpha \qquad \text{Formula (2-3)}$$

In Formulas (2-1) to (2-3), Dyi, Dmi, and Dci are the block densities of the virtual color materials (see FIGS. 5A to 5C), and a is a proportional constant related to the densities of the virtual color materials yi, mi, and ci. Further, the virtual color material amount V [%] means that the virtual color materials yi, mi, and ci are ejected onto a corresponding pixel to form an ink dot at a probability of V% on average. According to the above description, the arbitrary spectral reflectances Ref(λ) can be converted into the block densities Dy, Dm, and Dc through Formula (1) after the block reflectances are obtained. Further, the block densities can be uniquely converted into the virtual color material amounts Vyi, Vmi, and Vci [%] from the block densities Dy, Dm, and Dc and the constant α in accordance with Formulas (2-1) to (2-3).

Figure 6C:
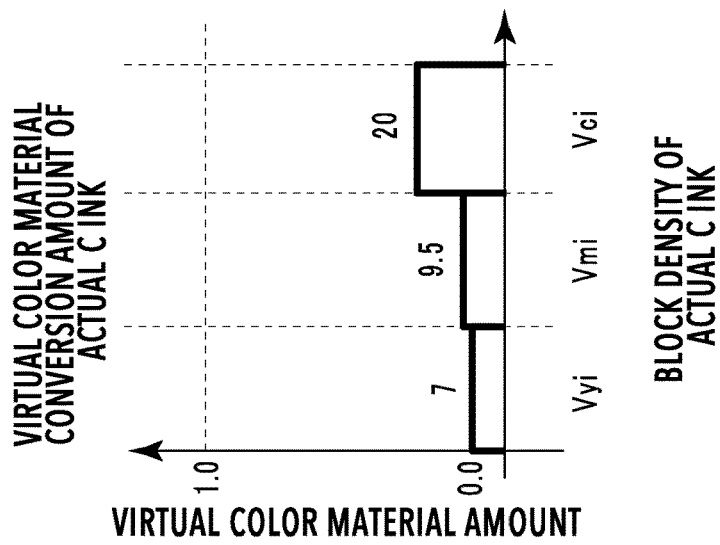
FIGS. 6A to 6C are diagrams for describing a reduction process to a virtual color material amount in the first embodiment.

Here, a specific example of converting the actual color material amount into the virtual color material amount will be described with reference to FIGS. 6A to 6C. In order to convert the actual color material amount into the virtual color material amount, first, a single color patch of each of the inks of C, M, Y, K, Lc, and Lm ink installed in the image forming device 200 is output. Then, the spectral reflectance Ref(λ) of the output single color patch is measured using a spectrocolorimeter or the like. FIG. 6A is a graph that schematically illustrates block reflectances Refy_c, Refm_c, and Refc_c obtained as a result of measuring a single color patch of an actual cyan ink. In the present embodiment, a single color patch of the actual cyan ink is printed on a blank printing medium through the image forming device 200, and an ink ejection amount R [%] thereof is, for example, 25%.

Figure 6B:
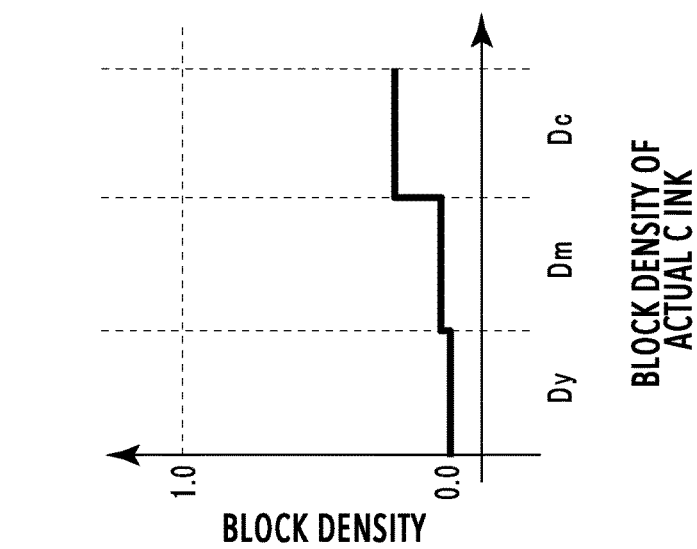
Figure 6A:
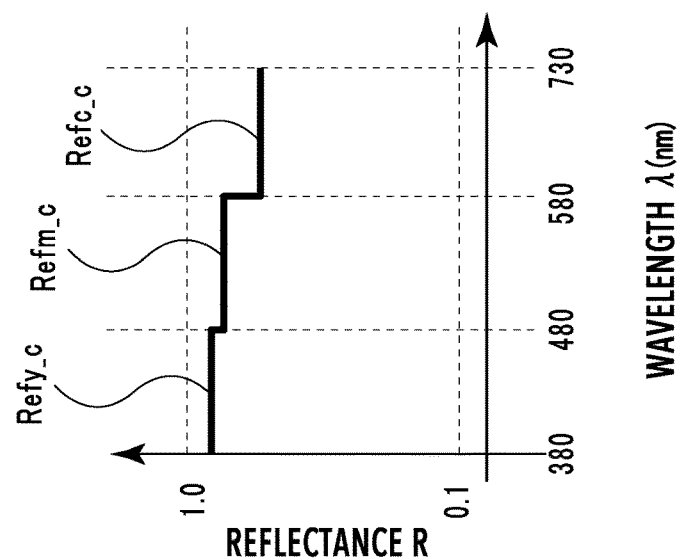

FIG. 6B is a graph schematically illustrating the block densities Dy, Dm, and Dc obtained as a result of performing the calculation of Formula (1) on the block reflectances Refy_c, Refm_c, and Refc_c of FIG. 6A. As described above, since the block densities Dy, Dm, and Dc and the virtual color material amounts Vyi, Vmi, and Vci can be linearly converted into one another, it is possible to calculate the virtual color material amounts Vyi, Vmi, and Vci from the block densities Dy, Dm, and Dc in accordance with Formulas (2-1) to (2-3). FIG. 6C illustrates an example of the virtual color material amounts Vyi, Vmi, and Vci calculated for the actual cyan ink. In the present embodiment, the virtual color material amounts calculated for the actual cyan ink are Vyi=7, Vmi=9.5, and Vci=20 [%]. In the example of FIG. 6C, the virtual color material amounts calculated using α=100 [%] is illustrated for convenience of description.

Further, the virtual color material amounts Vyi, Vmi, and Vci obtained in accordance with Formulas (2-1) to (2-3) are reduced to virtual color material amounts Vyi', Vmi', and Vci' per unit ejection amount. The reduction is performed by dividing the virtual color material amounts Vyi, Vmi, and Vci by the ink ejection amount R [%] of the single color patch. Specifically, it is possible to calculate the virtual color material amounts Vyi', Vmi', Vci' per unit ejection amount in accordance with the following Formulas (3-1) to (3-3).

$$Vyi'=Vyi/R \qquad \text{Formula (3-1)}$$

$$Vmi'=Vmi/R \qquad \text{Formula (3-2)}$$

$$Vci'=Vci/R \qquad \text{Formula (3-3)}$$

As described above, it is possible to convert the actual color material amount into the virtual color material amount on the basis of the block reflectance obtained as a result of measuring the single color patch of the actual color material. In the present embodiment, the process of reducing the actual color material amount to the virtual color material amount is assumed to be performed on each of the actual color materials C, M, Y, K, Lc, and Lm of the image forming device 200. At this time, the single color patch for measurement of the spectral reflectance Ref(λ) is assumed to be printed on a blank sheet with the ink ejection amount R=25%, and the virtual color material amounts Vyi', Vmi', and Vci' per unit ejection amount are stored in a storage region such as the HDD 316 for each type of actual color material.

(Generation of Initial Color Separation LUT)

Next, in the present embodiment, the procedure of generating an initial color separation LUT will be described with reference to FIGS. 7A and 7B, and FIGS. 8A to 8C. The initial color separation LUT in the present embodiment is generated by the LUT generating unit 301 of the LUT correcting device 300 on the basis of user instructions.

First, the initial color separation LUT serving as a generation target will be described in detail with reference to FIGS. 7A and 7B. FIG. 7A is a diagram illustrating a configuration of the initial color separation LUT in the present embodiment. As illustrated in FIG. 7A, the initial color separation LUT has grid points obtained by dividing a cube on a three-dimensional RGB color space (hereinafter also referred to as a "color cube") in a grid shape for the input RGB signal value. The initial color separation LUT of the present embodiment is a so-called an all-point LUT having 256×256×256 grid points. For each of the grid points in the color cube, the color material amounts (the color material values) of C, M, Y, K, Lc, and Lm installed in the image forming device 200 is provided are stored. In the LUT example illustrated in FIG. 7A, an example in which main grid points of p0:0, p1:32, p2 64, p3:96, p4:128, p5:160, p6:192, p7:224, p8:255 are arranged uniformly is illustrated. Usually, the three-dimensional LUT referred to in the color separation process stores the color material values only at the main grid points in order to save a storage capacity thereof, and the color material values between those grid points are calculated through the interpolation calculation. A process of thinning out the grid points of the initial color separation LUT only to the main grid points will be described later.

Figure 7B:
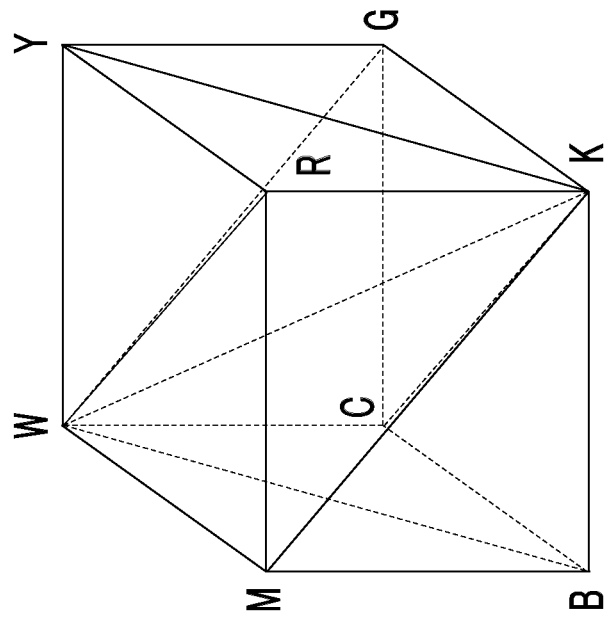
FIGS. 7A and 7B are diagrams illustrating an example of a three-dimensional color separation LUT in the first embodiment.
Figure 7A:
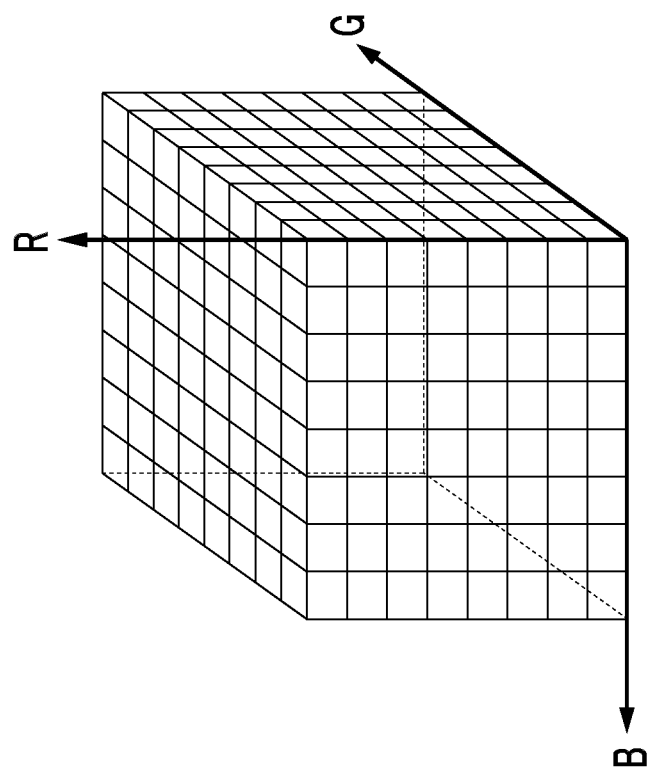

FIG. 7B is a schematic diagram of the RGB color space, that is, a diagram illustrating 8 peaks (W, C, M, Y, R, B, and K) of the color cube in FIG. 7A and lines connecting the peaks. Here, in a case in which 8-bit input image data is input for each of R, and B values, coordinates at the peaks of W, C, M, Y, R, B, and K in the color cube of FIG. 7B are as follows:

W=(255, 255, 255)
C=(0, 255, 255)
M=(255, 0, 255)
Y=(255, 255, 0)
R=(255, 0, 0)
G=(0, 255, 0)
B=(0, 0, 255)
K=(0, 0, 0)

First, the color material amounts corresponding to the peaks W, C, M, Y, R, B, and K are decided so that a reproduction color gamut is maximum in the RGB color space illustrated in FIGS. 7A and 7B. For example, since W is paper white, all the color material amounts corresponding to W are set to 0. For the peaks C, M, Y, and K of the primary color, in order to prevent turbidity of colors due to color mixing, the color material amount of only one type of color material corresponding thereto is set, and the other color material amounts other than one type of color material are set to 0. At this time, the color material amounts corresponding to C, M, Y, and K corresponds to a maximum load amount which can be printed in accordance with a type of printing medium, a printing mode, or the like. For the peaks R, and B of the secondary colors implemented by mixing of two types of color materials, for example in the case of R, color patch data of a plurality of combinations whose sum is a total color material amount is generated using two types of color materials of M and Y. The color patch data is printed through the image forming device 200, a user visually checks a printing result, and a combination of color material amounts which is a preferable color as a color corresponding to R is selected. Alternatively, a printing result of the color patch data may be measured using a colorimeter, and a combination of color material amounts which is a hue of the middle of hues of M and Y may be decided. For G and B, similarly to R, an optimal combination of color material amounts can be decided on the basis of a combination of Y and C in the case of G and a combination of C and M in the case of B. Hereinafter, in this specification, the peak C, M, Y, R, and B are referred to as primary colors.

Figure 8A:
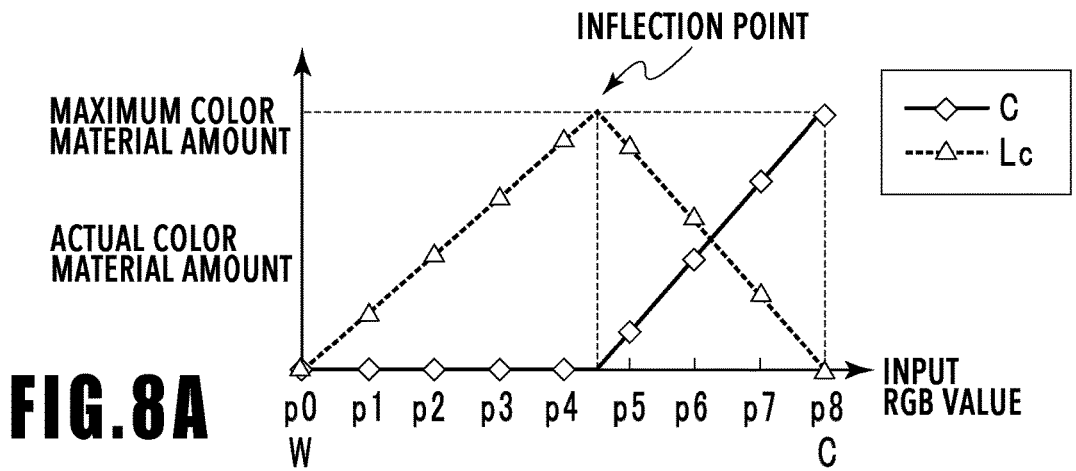
FIGS. 8A to 8C are diagrams illustrating an example of a color conversion characteristic in the first embodiment.

Next, the color material amounts in the lines W-C, W-M, W-Y, W-R, W-G, and W-B connecting the peak W with the primary colors are decided. FIG. 8A is a diagram illustrating an example of a color conversion characteristic in the line W-C, and a horizontal axis denotes an input RGB signal value, and a vertical axis denotes an actual color material amount and a maximum color material amount. Marks (◇ and △) in the graph of FIG. 8A indicate the color material amounts corresponding to the main grid points (p0 to p8) in the color cube (FIG. 7A). In FIG. 8A, the color material amounts of all the color materials corresponding to the peak W (p0) are 0. On the other hand, at the peak C (p8), the color material amount of the color material C is maximum, and the color material amounts of the other color materials are 0.

Here, in order to improve the granularity of the low density region in the print output, light cyan (Lc) is included as a type of ink installed in the image forming device 200 of the present embodiment. The graph illustrated in FIG. 8A illustrates an example in which the color material amount of the color material Lc gradually increases from the peak W (p0) until it becomes the maximum color material amount.

Then, in a case where the color material amount of the color material Lc reaches the maximum color material amount, the color material amount of the color material Lc decreases gradually up to the peak C (p 8). As the color material amount of color material LC decreases, the color material amount of the color material C which is a color material having good coloring now gradually increases up to the peak C (p8). At this time, a point at which the increase and the decrease of the color material Lc are switched (a point at which the increase of the color material C starts) is referred to as an "inflection point." In the present embodiment, for example, the graph illustrated in FIG. 8A can be displayed on the display unit 315 of the LUT correcting device 300 as a UI. For example, the user can decide a correspondence relation (a color conversion characteristic) between the input RGB value in the WC line and the color material amount by adjusting the actual color material amount of the color material corresponding to the grid point via the UI. Further, the image forming device 200 may be caused to print the color patch so that the user can visually evaluate the granularity and the color tint in a printing result of the color patch on the basis of the color conversion characteristic decided by the user. In the present embodiment, the process of deciding the color material amount in the line W-C has been described, but the color material amounts in the lines W-M, W-Y, W-R, W-G, and W-B can be similarly decided.

Figure 8B:
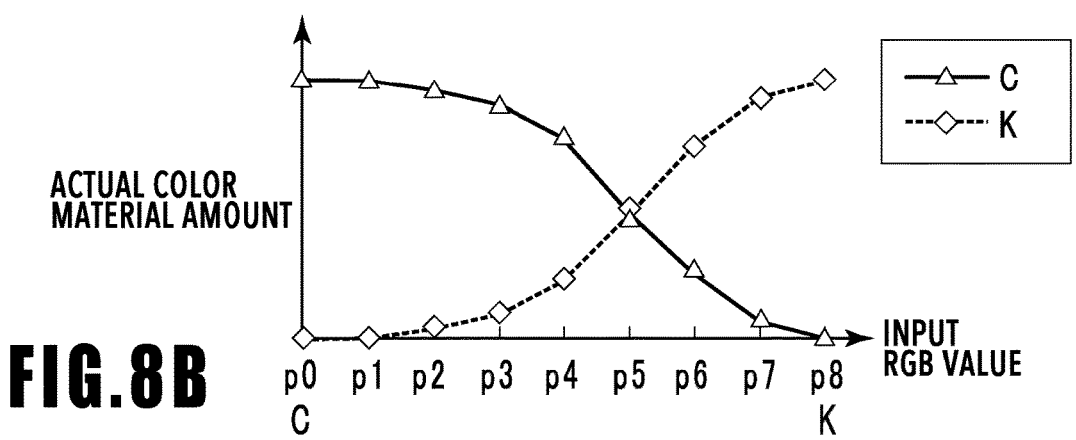
Figure 8C:

Next, the color material amount in each of the lines connecting the primary colors and the peak K and the color material amount in each of the lines connecting the primary colors and the primary colors are decided. In the lines connecting the primary colors and the peak K and the lines connecting the primary colors and the primary colors, in order to further increase the reproduction color gamut by the printed material, a design is performed so that a total color material amount of all the corresponding color materials becomes a maximum color material amount for each of the grid points of 0 to 255. An example of the color conversion characteristic in the lines connecting the primary colors and the peak K and an example of the color conversion characteristic in the lines connecting the primary colors and the primary colors are illustrated in FIGS. 8B and 8C, respectively.

As described above, in the generation of the initial color separation LUT, the color material amounts in the lines connecting the respective peaks with each other in the initial color separation LUT (color cube) having the 256×256×256 grid points are first decided. Then, the color material amounts in the initial color separation LUT (FIG. 7A) are sequentially decided through the interpolation process. As a specific method of the interpolation process, for example, a non-linear interpolation method using a known finite element method or the like can be applied.

(Color Separation LUT Correction Procedure)

Figure 9:
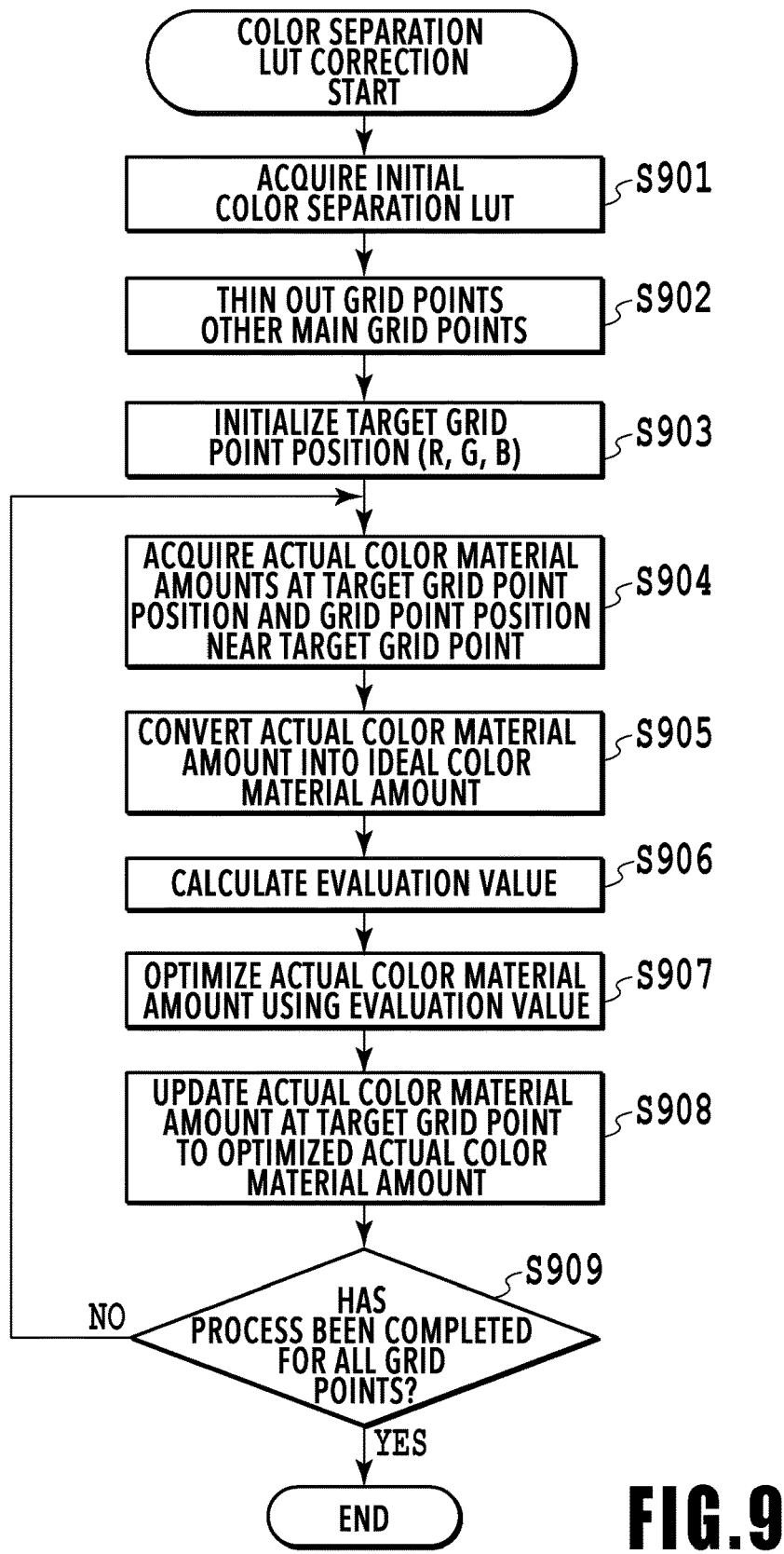
FIG. 9 is a flowchart illustrating a procedure of correcting a color separation LUT in the first embodiment.

Next, a color separation LUT correction procedure in the present embodiment will be described with reference to a flowchart of FIG. 9. A process of the flowchart illustrated in FIG. 9 is executed by the LUT correcting unit 303 of the LUT correcting device 300.

In S901, the initial color separation LUT is acquired. In the present embodiment, the initial color separation LUT which is generated by the LUT generating unit 301 and stored in the initial LUT storage unit 302 is read out. The initial color separation LUT generated by the technique described with reference to FIGS. 7A and 7B, and FIGS. 8A to 8C is read out, but the existing color separation LUT stored in the color separation LUT storage unit 104 may be acquired.

In S902, the grid points other than the main grid points of the initial color separation LUT are thinned out. A grid point thinning process in S902 is performed in order to save a storage capacity of the three-dimensional LUT referred to in the color separation process. In the present embodiment, the grid points other than the 9 main grid points (that is, 9×9×9 main grid points) in each of the R axis, G axis and B axis are thinned out from the initial color separation LUT having the 256×256×256 grid points. In other words, the color material amounts corresponding to the input RGB signal value are not stored at the grid points other than the main grid points. Then, the color separation LUT thinned out in S902 is stored in the color separation LUT storage unit 104.

In S903, a target grid point serving as a correction target is initialized. In the present embodiment, the peak W (RGB= (0, 0, 0) in the initial color separation LUT is set as a first target grid point.

In S904, the actual color material amounts (the actual color material values) held at the target grid point serving as an evaluation target position and the grid points arranged at positions near the target grid point (hereinafter referred to as "neighbor grid points") are acquired. In the present embodiment, the actual color material amounts held at the grid point group (3×3×3=27 points) in three dimensions in the directions of the R axis, the G axis, and the B axis centering on the target grid point are acquired. In a case where the neighbor grid point is positioned outside a definition range of the initial color separation LUT, the actual color material amount corresponding to the neighbor grid point is not acquired.

In S905, the actual color material amount at the target grid point and the actual color material amount at the neighbor grid point are converted into the virtual color material values indicating the virtual color material amounts, respectively. As described with reference to FIGS. 6A to 6C, in the present embodiment, the virtual color material amounts $Vyi'$, $Vmi'$, and $Vci'$ per unit ejection amount are calculated in advance for each of the actual color materials C, M, Y, K, Lc, and Lm installed in the image forming device 200. The actual color material amount at the target grid point and the actual color material amount at the neighbor grid point are converted into the virtual color material values (the virtual color material amounts) on the basis of the virtual color material amounts $Vyi'$, $Vmi'$, and $Vci'$ per unit ejection amount calculated in advance. For example, in a case where the virtual color material amounts of a color material i at a grid point p are indicated by $Vyi$, $Vmi$, and $Vci$, and the actual color material amount of the color material i at the grid point p is indicated by Q(p, i) [%], $Vyi$, $Vmi$, and $Vci$ can be calculated in accordance with the following Formulas (4-1) to (4-3).

$$Vyi(p,i)=Vyi'(i)*Q(p,i) \quad \text{Formula (4-1)}$$

$$Vmi(p,i)=Vmi'(i)*Q(p,i) \quad \text{Formula (4-2)}$$

$$Vci(p,i)=Vci'(i)*Q(p,i) \quad \text{Formula (4-3)}$$

The process of converting the actual color material amount into the virtual color material amount will be described with reference to FIG. 8A. As described above, at the peak C (the grid point p8) in the line W-C, the color material amount of the C ink is 255 (100%), and all the color material amounts of inks other than the C ink are 0 (0%), that is, (C, Y, K, Lc, Lm)=(100, 0, 0, 0, 0, 0) [%]. At this time, the virtual color material amounts at the grid point p8 (the peak C) are calculated as follows in accordance with the above Formula (4-1) to Formula (4-3).

$$Vyi(p8)=0.28*100=28$$

$$Vmi(p8)=0.38*100=38$$

$$Vci(p8)=0.80*100=80$$

At the grid point p6 in the line W-C, the color material amount of the C ink is 102 (40%), the color material amount of the Lc ink is 153 (60%), and all the other color material amounts are 0 (0%), that is, (C, M, Y, K, Lc, Lm)=(40, 0, 0, 0, 60, 0,) [%]. At this time, the virtual color material amount at the grid point p6 is a value obtained by adding the virtual color material amount calculated for the C ink and the virtual color material amount calculated for the Lc ink.

$$Vyi(p6)=0.28*40+0.16*60=20.8$$

$$Vmi(p6)=0.38*40+0.22*60=28.4$$

$$Vci(p6)=0.80*40+0.48*60=60.8$$

In the above calculation example, the virtual color material amounts $Vyi'$, $Vmi'$, and $Vci'$ per unit ejection amount calculated in advance for the actual Lc ink are $Vyi'=0.16$, $Vmi'=0.22$, and $Vci'=0.48$. The virtual color material amounts $Vyi'$, $Vmi'$, and $Vci'$ per unit ejection amount are calculated in advance through the technique described in FIGS. 6A to 6C and Formulas (3-1) to (3-3).

Then, in S906, the evaluation value at the target grid point is calculated. In the present embodiment, the uniformity of the virtual color material amount in the RGB color space is used as the evaluation value. Specifically, a change between the virtual color material amount at the target grid point and the virtual color material amount at the adjacent grid point is indicated by a displacement vector, and a magnitude of a sum of the vectors is calculated as the evaluation value. A method of calculating the evaluation value differs depending on the position of the target grid point in the RGB color space.

FIGS. 10A to 10C are diagrams for describing a method of calculating the evaluation value in the present embodiment. FIG. 10A is a schematic diagram illustrating the target grid point and the adjacent grid point in the line W-C. At this time, since there is only one position relation in which the target grid point is positioned between two adjacent grid points, an evaluation value E is calculated in accordance with the following Formula (5).

$$E=|(Vr1-Vp)+(Vr0-Vp)|/|Vr1-Vr0| \quad \text{Formula (5)}$$

In Formula (5), Vp indicates the virtual color material amount corresponding to the target grid point, and Vr0 and Vr1 indicate the virtual color material amounts corresponding to the adjacent grid points.

FIG. 10B is a diagram illustrating the target grid point and the adjacent grid point on a surface of an initial color separation LUT (a color cube) partitioned by the G axis and the R axis. At this time, since there are two position relations in which the target grid point is positioned between two adjacent grid points, the calculation using Formula (5) is performed on a combination of each of (Vr0, Vp, Vr1) and (Vg0, Vp, Vg1). Then, as illustrated in FIG. 10B, a sum of calculation results is obtained as the evaluation value E.

FIG. 10C is a diagram illustrating the target grid point and the adjacent grid point in the initial color separation LUT (the color cube). At this time, since there are three positional relationships in which a target grid point is positioned between two adjacent grid points, the calculation using Formula (5) is performed on a combination of each of (Vr0, Vp, Vr1), (Vg0, Vp, Vg1), and (Vb0, Vp, Vb1). Then, as illustrated in FIG. 10C, a sum of calculation results is obtained as the evaluation value E.

At S907, the actual color material amount at the target grid point is optimized using the evaluation value E calculated by the technique of FIGS. 10A to 10C. Specifically, first, the virtual color material amount corresponding to the target grid point is increased or decreased so that the evaluation value E decreases. The increased or decreased virtual color material amount is converted into the actual ink amount again.

Figure 11A:
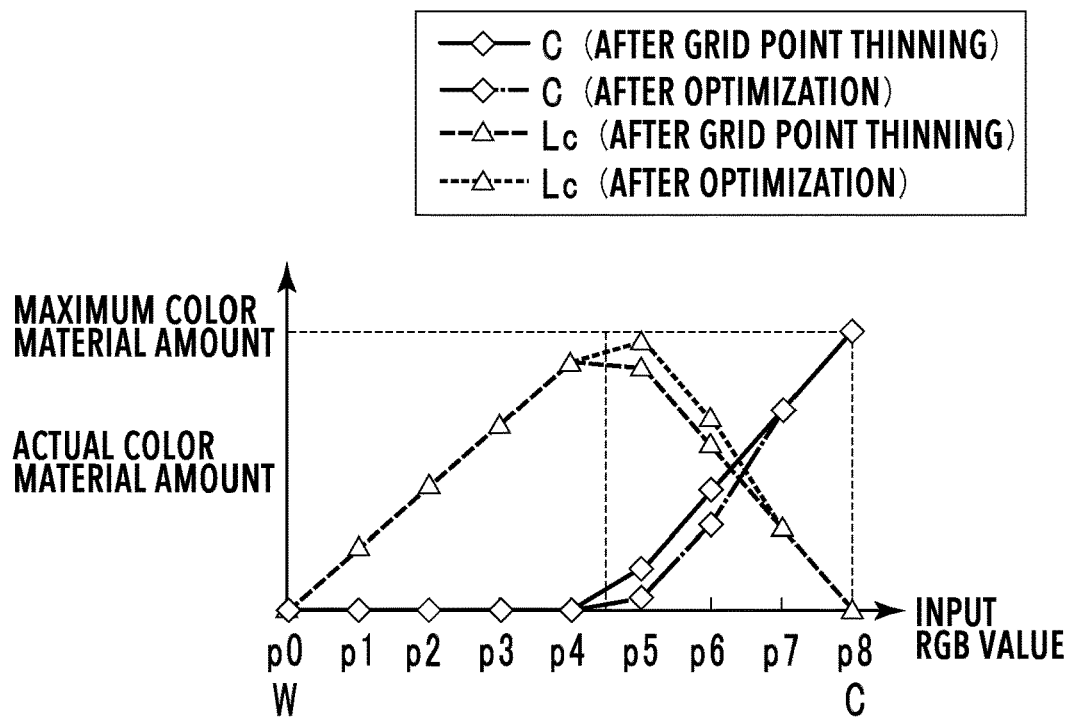
FIGS. 11A and 11B are diagrams for describing an example in which an actual color material amount is corrected in the first embodiment.
Figure 11B:
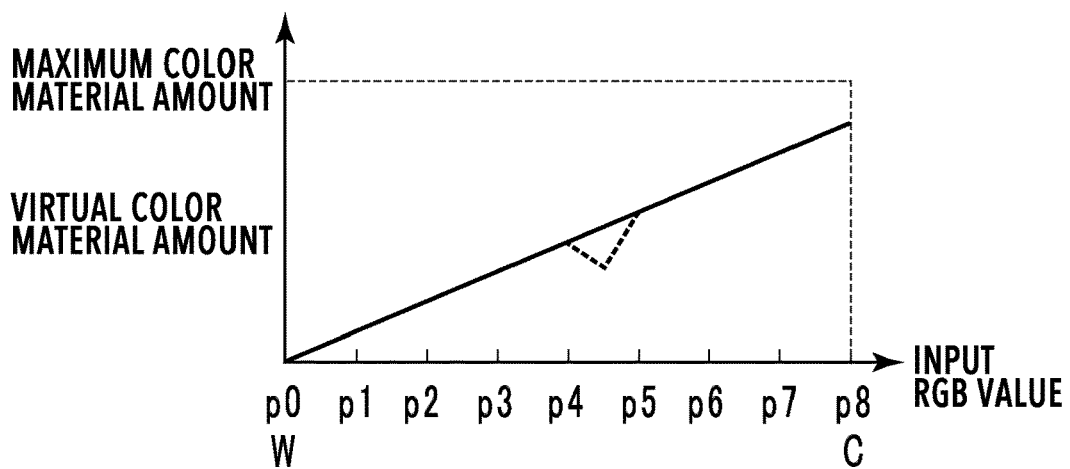

The process of optimizing the actual color material amount in S907 will be described with reference to FIGS. 11A and 11B. FIG. 11A is a diagram illustrating a color conversion characteristic in the initial color separation LUT after the grid points other than the main grid point are thinned out in S902. In the color conversion characteristic of FIG. 11A, the color material amount between the grid points is assumed to be calculated through the linear interpolation. On the other hand, FIG. 11B illustrates an example of the virtual color material amounts converted from the color material amount of the actual C ink in the graph of FIG. 11A and the color material amount of the actual Lc ink (S905). For the convenience of description, only transition of the virtual color material amount Vci among the virtual color material amounts Vyi, Vmi, and Vci is illustrated in the graph of FIG. 11B. In the graph illustrated in FIG. 11B, an example of the virtual color material amount before increased or decreased (S907) is indicated by a broken line, and an example of the virtual color material amount after increased or decreased (S907) is indicated by a solid line.

In the graph of FIG. 11B, the broken line illustrates that in the color conversion characteristic of FIG. 11A, the linearity of the color material amounts of the actual C ink and the color material amounts of the actual Lc ink collapses. In other words, in the graph of FIG. 11A, the color material amount of the actual Lc ink near the inflection point is reduced by the interpolation calculation as compared with the graph in FIG. 8A. Similarly, in the graph of FIG. 11A, the color material amount of the actual C ink near the inflection point is increased by the interpolation calculation as compared with the graph in FIG. 8A. As described above, an error occurring between the color material amount which can be acquired if the all-point LUT is referred to and the color material amount calculated by the interpolation calculation is referred to as an "interpolation error" in the present embodiment. In the present embodiment, since the linear relation is established between the actual color material amount and the virtual color material amount, even in a case where the linearity of the color material amount of the actual ink collapses due to the interpolation error or the like, an abrupt change of the color material amount can be indicated by the transition of the virtual color material amount. Then, in the present embodiment, the process of optimizing the actual color material amount is executed by adjusting the virtual color material amount at the target grid point on the basis of the evaluation value E while considering the characteristic of the virtual color material amount and performing the process of converting the adjusted virtual color material amount into the actual color material amount again. As described above, in the graph of FIG. 11B, the transition of the virtual color material amount which is increased or decreased on the basis of the evaluation value E is indicated by the solid line. In S907, the process of converting the increased or decreased virtual color material amount into the actual color material amount is executed. A graph line of the color material amount of the actual Lc ink after the optimization and a graph line of the color material amount of the actual C ink after the optimization are illustrated in FIG. 11A.

In S908, the actual color material amount at the target grid point is updated to the actual color material amount optimized in S907. Thus, in the present embodiment, the actual color material amount at the target grid point is corrected so that the evaluation value E is decreased, and thus the initial color separation LUT is corrected so that the actual color material amount for the input RGB signal value has a satisfactory gradation property.

In S909, it is determined whether the correction has been completed for all the grid points. In a case where the correction is completed (S909: YES), the process of the present flowchart ends. In a case where the correction is not completed (S909: NO), the target grid point is caused to move to a next grid point, and the process of S904 and subsequent steps is repeated again.

As described above, according to the LUT correcting device 300 of the present embodiment, it is possible to evaluate the conversion characteristic of the color separation LUT using the virtual color material amount in which the relation with the actual color material amount is linear. Further, it is possible to correct the color separation LUT on the basis of this evaluation result so that the change of the actual color material amount for the input image signal value becomes smooth. In other words, the LUT correcting device of the present embodiment has the effect in that it is possible to further improve the gradation property implemented by the color conversion look-up table.

Modified Examples

The above-described embodiment is an example, and the present embodiment can be applied to the following modified examples. In the present embodiment, types of ink installed in the printing head 205 are the six colors of C, M, Y, K, Lc, and Lm, but the type of ink installed in the printing head 205 is not limited thereto. Specifically, a solid color ink such as red (R) or green (G) or white ink may be installed in the printing head 205. Alternatively, a colorless and transparent clear ink or a metal-tone metallic ink may be installed in the printing head 205.

In the present embodiment, the example in which the 8-bit RGB color image data is input to the image processing device 100 has been described, but monochrome image data or CMYK image data may be input to the image processing device 100. Further, input image data may include information other than the color information for each pixel, and may include, for example, gloss information for each pixel. In this case, similarly to the gradation property of the color tint based on an ink ejection amount, it is also possible to execute the conversion characteristic correction process on the gradation property of the coloring.

Further, in the present embodiment, the number of grids (the number of grid points of each of the R axis, the G axis, and B axis) in the color separation LUT is 256 for the color separation LUT before thinning and 9 for the color separation LUT after thinning. The number of grids in the color separation LUTs is not limited to the above example.

Further, a color conversion parameter indicating a color conversion characteristic from the input image signal value into the actual color material amount may be in a form other than the color separation LUT and may be implemented by, for example, a matrix operation or a mathematical formula. In this case, in the process of correcting the color conversion characteristic (color conversion parameter), coefficients in the matrix or coefficients in the mathematical formula are corrected.

In the present embodiment, the example in which the dither matrix method is applied as an example of the halftone process has been described, but a method such as a known error diffusion method may be applied in addition to the dither matrix method. For the path separation method, the pass separation process may be performed in accordance with a single pass scheme instead of a multipath scheme.

In the present embodiment, the example in which the LUT correcting unit 303 corrects the initial color separation LUT generated by the LUT generating unit 301 has been described, but an existing color separation LUT (for example, an LUT stored in the color separation LUT storage unit 104 LUT or the like) may be used. In this case, in S901, the color separation LUT stored in the color separation LUT storage unit 104 is read out, and in a case in which the read color separation LUT is, for example, a thinned color separation LUT having 9×9×9 grid points, S902 is omitted.

Further, in the present embodiment, the technique of calculating the evaluation value on the basis of the displacement vector in the RGB color space has been described as the technique of calculating the evaluation value of the virtual color material amount (S906), but the evaluation method is not limited to the above example. For example, the evaluation value may be calculated on the basis of the displacement vector of the actual color material amount in the virtual color material amount space. Further, for example, the evaluation value may be calculated on the basis of a curvature without using the displacement vector. Further, instead of the evaluation based on the displacement vectors, a combination with any other evaluation technique may be used. For example, a difference between the actual color material amount in the initial color separation LUT and the actual color material amount in the thinned LUT may be derived, and the evaluation process may be executed on the basis of a linear sum of differences between the evaluation value based on the displacement vector and the actual color material amount. In the present embodiment, since the actual color material amount is used as the target of the optimization process (S907), the color reproduction gamut may be reduced by the optimization, but it is possible to reduce the deduction in the color reproduction gamut by performing the evaluation using the actual color material amount difference. Further, in the present embodiment, the example in which the quasi-Newton method is applied in the optimization of the actual color material amount (S907) has been described, but, for example, an arbitrary optimization method such as a known Levenberg-Marquardt method or a genetic algorithm can be applied. Further, the optimization target is not limited to the actual color material amount, but an effect is obtained, for example, even in a case where the RGB values of the grid point in the color separation LUT is optimized. In this case, it is possible to suppress the reduction in the color reproduction gamut by constraining the optimized RGB value to the inside of the surface of the color cube in the six surfaces of the color cube in the RGB space.

Second Embodiment

In the first embodiment, the example of correcting the color conversion characteristic of the color separation LUT thinned out to the 9×9×9 grid points has been described. However, the intervals of the grid points in the color separation LUT are not necessarily uniform as in the color separation LUT of the first embodiment. For example, it is possible to cause the grid point positions of the three-dimensional color separation LUT to be non-uniform by non-linearly converting the input RGB signal value with reference to a one-dimensional non-linear conversion LUT before the color separation process. In the present embodiment, an example of correcting such a one-dimensional non-linear conversion LUT using the virtual color material amount will be described. Hereinafter, description of parts common to those in the first embodiment will be simplified or omitted, and the following description will proceed focusing on points specific to the present embodiment.
(Overall Structure of Printing System)

Figure 12:
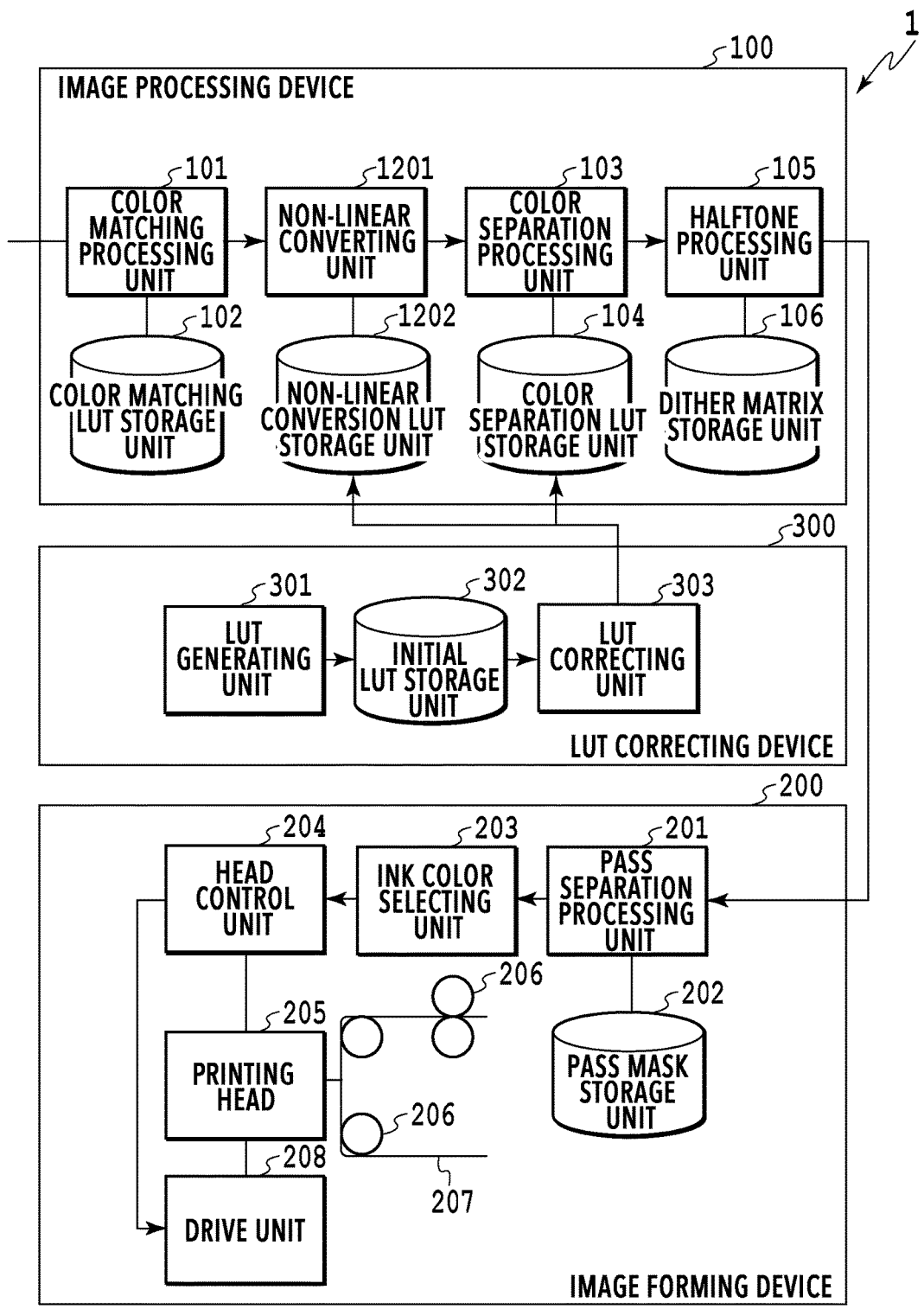
FIG. 12 is a block diagram illustrating an example of an overall configuration of a printing system in a second embodiment.

FIG. 12 is a block diagram illustrating an overall configuration example of a printing system 1 in the present embodiment. A difference from the printing system 1 of the first embodiment lies in that a non-linear converting unit 1201 and a non-linear conversion LUT storage unit 1202 are added to the image processing device 100. The non-linear converting unit 1201 performs non-linear conversion on each of the RGB signal values in the RGB image data which has undergone the color matching process, and transmits the non-linearly converted RGB image data to the color separation processing unit 103. The non-linear conversion process is performed for each ink color installed in the image forming device 200. In the non-linear conversion process, a one-dimensional non-linear conversion LUT with a non-linear characteristic stored in non-linear conversion LUT storage unit 1202 is used. In the present embodiment, a fixed value (output value) corresponding to a input RGB signal value is held at a grid point in the non-linear conversion LUT, and the fixed value is used as an input value in the color separation LUT.
(Non-Linear Conversion LUT)

Figure 13:
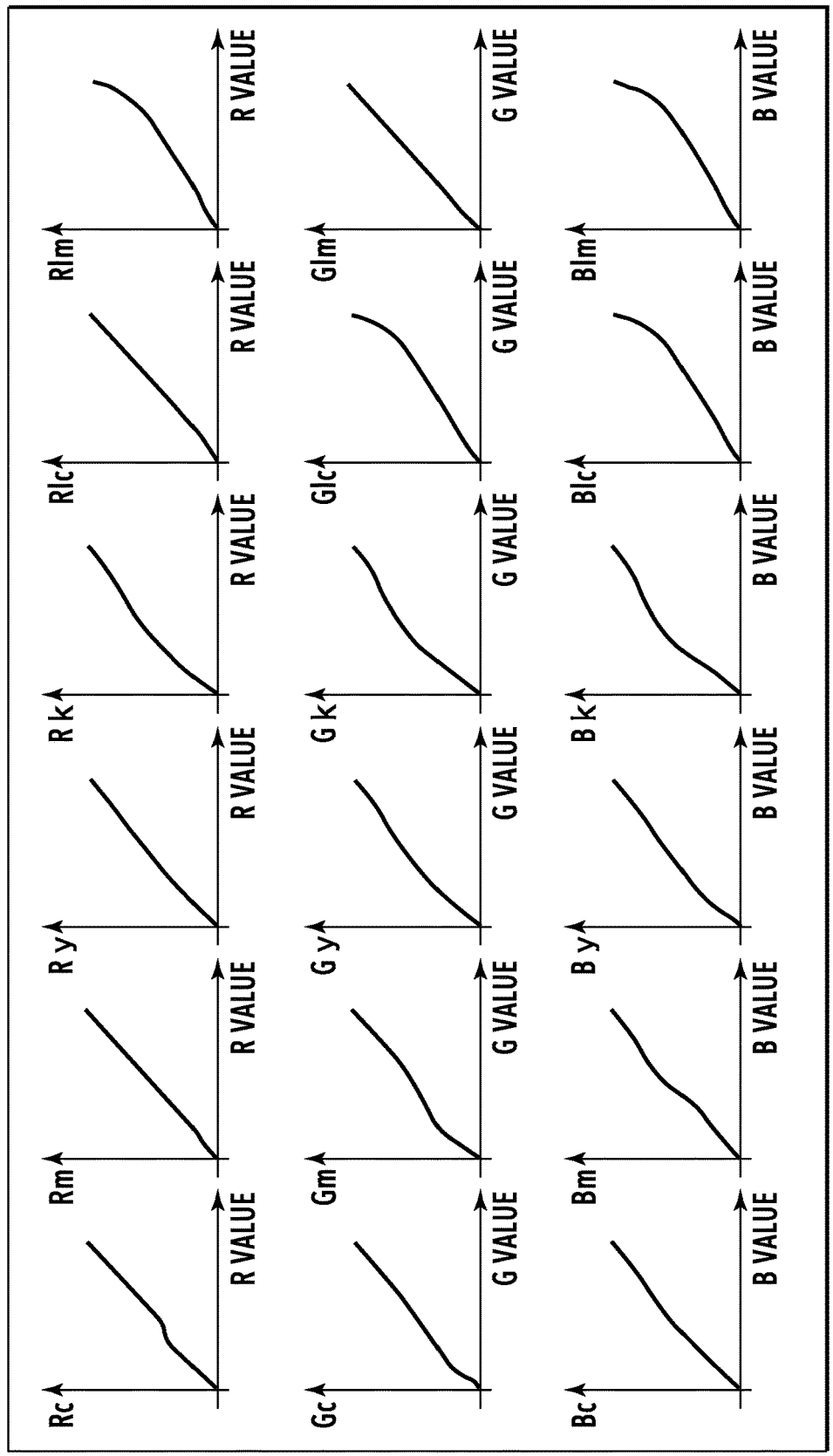
FIG. 13 is a schematic diagram illustrating an example of a non-linear conversion LUT in the second embodiment.

FIG. 13 is a schematic diagram illustrating an example of a non-linear conversion LUT in the present embodiment. Graphs illustrated in FIG. 13 illustrate non-linear characteristics of the R axis, the G axis, and the B axis in a case where a horizontal axis denotes the input RGB signal value, and a vertical axis denotes an output RGB signal value after the non-linear conversion and correspond to the ink types of C, M, Y, K, Lc, and Lm, respectively. Each of the non-linear conversion LUTs illustrated in FIG. 13 has 17 grid points on each axis, and a converted output value corresponding to input RGB image data of 8 bits (256 gradations) is stored at each grid point. The output value between grid points is calculated through the linear interpolation.
(Non-Linear Conversion LUT Correction Procedure)

Figure 14:
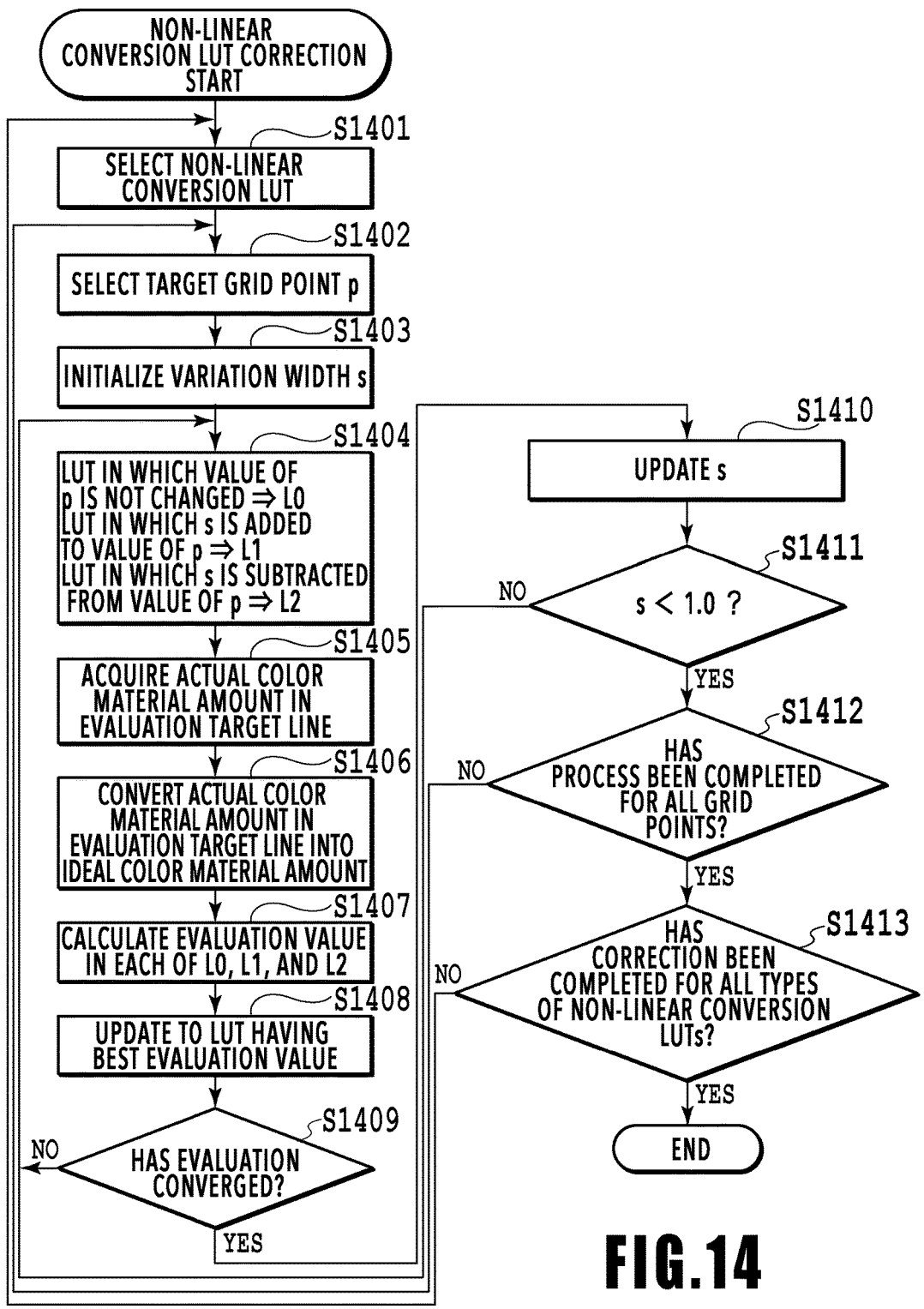
FIG. 14 is a flowchart illustrating a procedure of correcting the non-linear conversion LUT in the second embodiment.

Next, a non-linear conversion LUT correction procedure in the present embodiment will be described with reference to the flowchart of FIG. 14. A process of the flowchart illustrated in FIG. 14 is executed by the LUT correcting unit 303 of the LUT correcting device 300.

In S1401, a non-linear conversion LUT serving as a correction target is selected. In the present embodiment, the non-linear conversion LUT of the R axis of the C ink is first selected among the non-linear conversion LUTs which are generated by the LUT generating unit 301 and stored in the initial LUT storage unit 302. In the present embodiment, an initial non-linear conversion LUT read from the initial LUT storage unit 302 has a linear conversion characteristic in which the input RGB signal value and the output RGB signal value are equal.

In S1402, a target grid point p is selected from the grid points in the non-linear conversion LUT selected in S1401. The positions of the start point (the input RGB signal value=the grid point of 0) and the end point (the input RGB signal value=the grid point of 255) in the non-linear conversion LUT are fixed, and in the present embodiment, the grid point adjacent to the start point is first selected as the target grid point p.

In S1403, a parameter s is initialized. In the present embodiment, the parameter s indicates a variation range, and a value of the initialized parameter s is "8."

In S1404, the output RGB signal value at the target grid point p is varied on the basis of the initialized parameter s. Specifically, a process for adding the initialized parameter s and a process of subtracting the initialized parameter s are performed on the output RGB signal value at the target grid point p. Then, for the target grid point p, three types of intermediate LUTs, that is, L0 in which the output RGB signal value is not changed, L1 in which the parameter s is added to the output RGB signal value, and L2 in which the parameter s is subtracted from the output RGB signal value are generated.

In S1405, the actual color material amounts in an evaluation target line are calculated using the three types of intermediate LUTs generated in S1404 and the color separation LUT. Here, the evaluation target line in the present embodiment refers to a line connecting the peaks W, C, M, Y, R, B, and K illustrated in FIG. 7B, and there are 28 evaluation target lines. In S1405, first, RGB input signal values in the evaluation target line are converted through the three types of intermediate LUTs and then further converted into the actual color material amounts through the color separation LUT. As a result, three types of actual color material amounts corresponding to the three types of intermediate LUTs (L0 to L2) are acquired for one evaluation target line. The color separation LUT stored in the color separation LUT storage unit 104 is preferably used as the color separation LUT referred to in S1405, but the corrected color separation LUT described in the first embodiment may be referred to. The color separation LUT stored in the color separation LUT storage unit 104 and the corrected color separation LUT are three-dimensional color separation LUTs in which the grid points other than the main grid points are thinned out to 9×9×9 grid points.

In S1406, the actual color material amount in the evaluation target line is converted into the virtual color material amount. The conversion from the actual color material amount into the virtual color material amount can be executed in accordance with the technique of FIGS. 6A to 6C and Formulas (4-1) to (4-3). As a result of the conversion processing in S1406, three types of virtual color material amounts corresponding to the three types of intermediate LUTs (L0 to L2) are acquired.

In S1407, evaluation values E0, E1, and E2 are calculated for each of the three types of virtual color material amounts calculated in S1406. In the technique of calculating the evaluation values E0 to E2 on the basis of the virtual color material amount, for example, a maximum value of a value obtained by squaring the curvature of the virtual color material amount in the evaluation target line to the power of 2 is used.

In S1408, the evaluation values E0 to E2 are compared with each other, and an intermediate LUT having the best evaluation value among the three types of intermediate LUTs (L0 to L2) is selected. Then, the initial non-linear conversion LUT is updated to the intermediate LUT having the best evaluation value.

In S1409, it is determined whether or not the evaluation value has converged. In the present embodiment, in a case where the evaluation value E0 corresponding to L0 in which the output RGB signal value is not varied by the parameter s is calculated (S1407), the evaluation value is determined to have converged. In a case where the evaluation value has converged (S1409: YES), the process proceeds to S1410. In a case where the evaluation value has not converged (S1409: NO), the process returns to S1404.

In S1410, the value of the parameter s is updated. In the present embodiment, the value of the parameter s is updated to a value (for example, "4") obtained by dividing the current value of s (for example, "8") by 2.

In S1411, it is determined whether or not the value of s is less than 1.0. In a case where the value of s is 1.0 or more (S1411: NO), the process returns to 1404, and in a case where the value of s is less than 1.0 (S1411: YES), the process proceeds to S1412.

In S1412, it is determined whether or not the optimization process has been completed for all the grid points. In a case where the optimization process has not been completed for all the grid points (S1412: NO), the process returns to S1402, and in a case where the optimization process has been completed for all the grid points (S1412: YES), the process proceeds to S1413.

In S1413, it is determined whether or not the correction process has been completed for all types of non-linear conversion LUTs. In a case where the correction process has not been completed for all types of non-linear conversion LUTs (S1413: NO), the process returns to S1401, and in a case where the correction process has been completed for all types of non-linear conversion LUTs (S1413: YES), the process of the present flowchart ends.

As described above, according to the LUT correcting device 300 of the present embodiment, it is possible to evaluate the conversion characteristic of the one-dimensional non-linear conversion LUT which is referred to before the color separation process using the virtual color material amount. Further, it is possible to correct the one-dimensional non-linear conversion LUT on the basis of the evaluation result so that the position of the grid point in the color separation LUT becomes appropriate.

Modified Examples

The above-described embodiment is an example, and the present embodiment can be applied to the following modified examples. In the present embodiment, the example in which the non-linear conversion process of the input RGB signal value is performed for each ink color has been described, but it may be a process common to the ink colors. Further, only for some ink colors, a common non-linear conversion LUT may be referred to. Further, in the present embodiment, the number of grids in the non-linear conversion LUT is 17, but the number of grids in the non-linear conversion LUT is not limited to the above example. Particularly, in a case where the number of grids in the non-linear LUT is larger than the number of grids in the color separation LUT, it is possible to bend an ink curve between the grid points of the color separation LUT and thus implement more suitable interpolation. In the non-linear conversion LUT, the example in which the output RGB signal value between the grid points is calculated through the linear interpolation has been described, but the interpolation method is not limited to the above example, and the interpolation method such as spline interpolation can be applied.

The non-linear conversion parameter indicating the conversion characteristic from the input RGB signal value into the output RGB signal value may be in a form other than the one-dimensional non-linear conversion LUT and may be implemented by, for example, a matrix operation or a mathematical formula. In this case, in the correction process of the non-linear conversion parameter, coefficients in the matrix or coefficients in the mathematical formula are corrected.

Further, the color separation processing unit 103 may include the non-linear converting unit 1201. In the present embodiment, the example in which the curvature of the virtual color material amount in the evaluation line is calculated as the evaluation value has been described, but instead of the maximum value of the curvature, an average value of the curvature may be calculated as the evaluation value, and a linear sum of a plurality of evaluation values can also be applied.

Third Embodiment

In the first embodiment, the color conversion characteristic of the color separation LUT is evaluated using the virtual color material amount, and the color separation LUT is corrected on the basis of this evaluation result so that the change in the actual color material amount with respect to the input image signal value becomes smooth. However, image processing other than the color separation process may be performed before a final actual color material amount is decided in the image processing device 100. As one example of such a process, an output gamma (OPG) process is known. The OPG process is a process performed to improve the linearity of the color material amount and brightness, and in the OPG process, the actual color material amount is corrected with reference to the one-dimensional OPGLUT. In other words, in order to obtain a satisfactory gradation characteristic, it is necessary to properly set the conversion characteristic in the OPGLUT. In the present embodiment, an example in which the conversion characteristic of the OPGLUT is evaluated using the virtual color material amount, and the OPGLUT is corrected on the basis of this evaluation result so that the change in the actual color material amount with respect to the input image signal value becomes smooth will be described. Hereinafter, description of parts common to those in the first and second embodiments will be simplified or omitted, and the following description will proceed focusing on points specific to the present embodiment.

(Overall Structure of Printing System)

Figure 15:
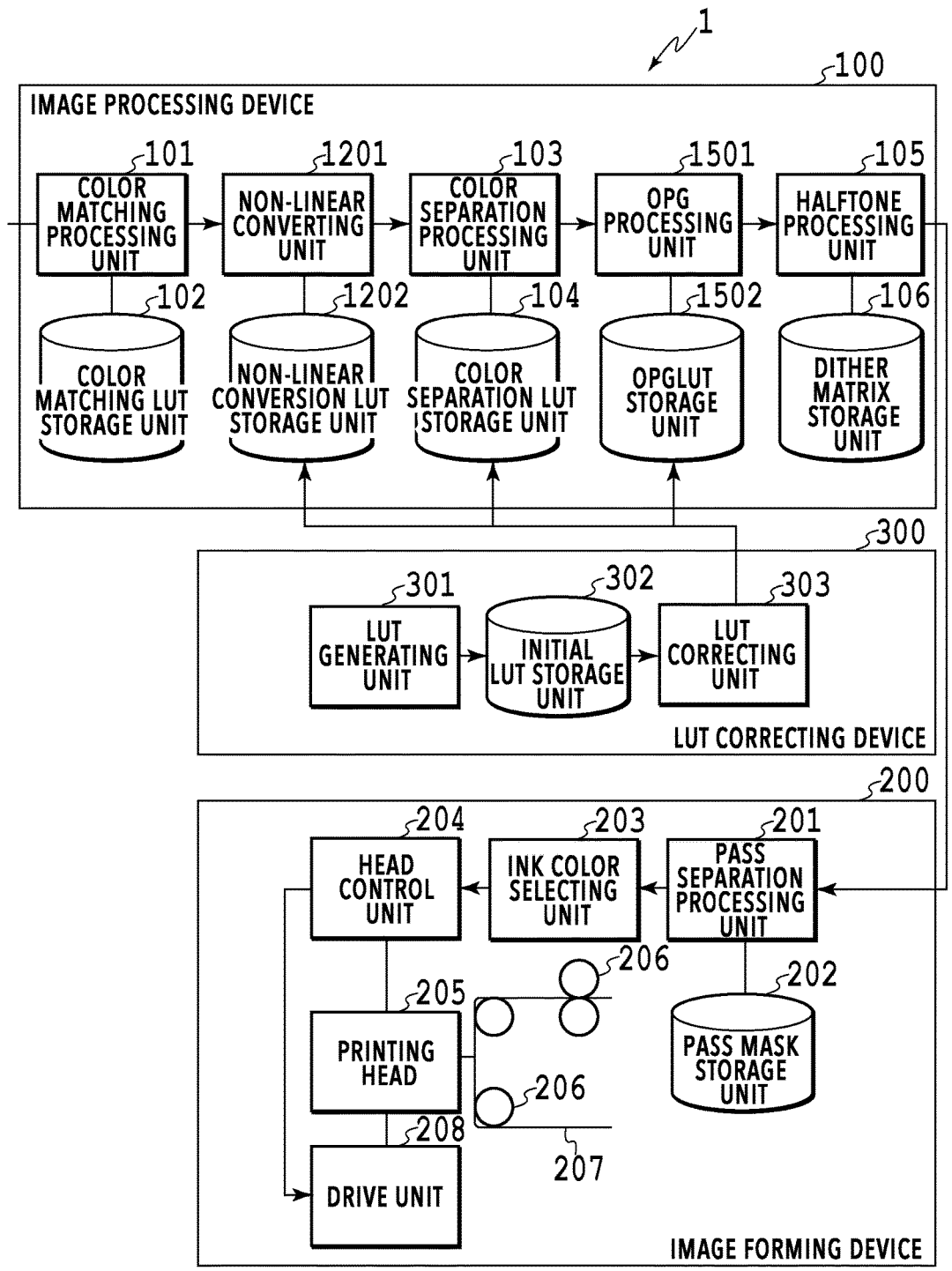
FIG. 15 is a block diagram illustrating an example of an overall configuration of a printing system in a third embodiment.

FIG. 15 is a block diagram illustrating an overall configuration example of a printing system 1 in the present embodiment. A difference from the printing system 1 of the second embodiment lies in that an OPG processing unit 1501 and an OPGLUT storage unit 1502 are added to the image processing device 100. The OPG processing unit 1501 performs the OPG process on the ink value image data generated by the color separation processing unit 103. In a case where the OPG process is performed, the OPG processing unit 1501 refers to the one-dimensional OPGLUT stored in the OPGLUT storage unit 1502.

(OPGLUT)

Figure 16:
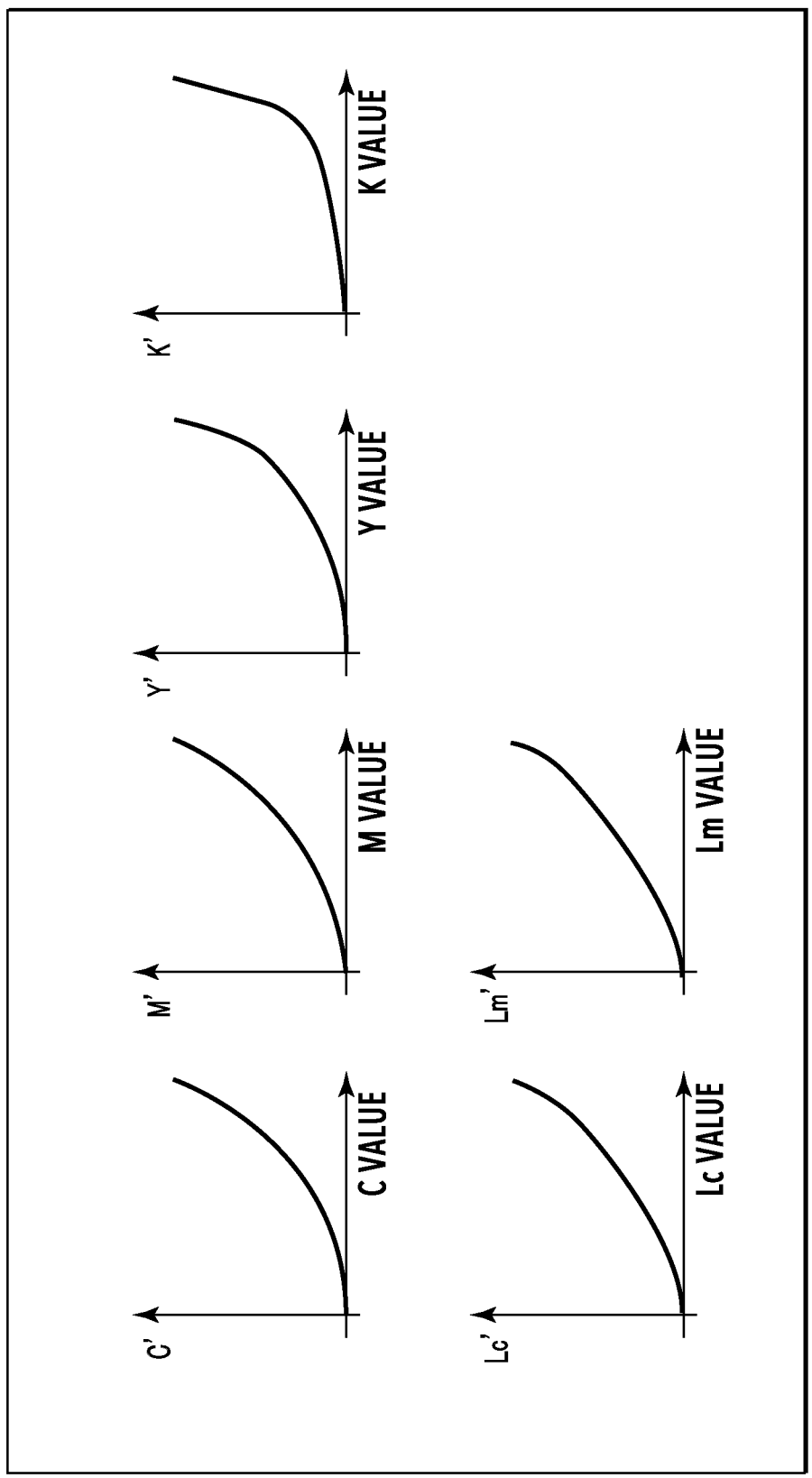
FIG. 16 is a schematic diagram illustrating an example of an OPGLUT in the third embodiment.

FIG. 16 is a schematic diagram illustrating an example of the OPGLUT in the present embodiment. Graphs illustrated in FIG. 16 are graphs in which a horizontal axis denotes the input color material amount which has undergone the color separation process, and a vertical axis denotes the output color material amount which has undergone the OPG process and the respective graphs correspond to ink types of C, M, Y, K, Lc, and Lm. In the present embodiment, the input color material amount is indicated by 8 bits (256 gradations), and a graph line in each graph in FIG. 16 indicates transition of the output color material amounts corresponding to the input color material amounts of the 256 gradations.

(OPGLUT Correction Procedure)

The OPGLUT correction procedure and the non-linear conversion LUT correction procedure described in the second embodiment have many parts in common. Therefore, the OPGLUT correction procedure in the present embodiment will also be described with reference to the flowchart of FIG. 14. In the present embodiment, the process of the flowchart illustrated in FIG. 14 is executed by the LUT correcting unit 303 of the LUT correcting device 300.

In S1401, an OPGLUT serving as a correction target is selected. In the present embodiment, an OPGLUT of the C ink is first selected among the OPGLUTs which are generated by the LUT generating unit 301 and stored in the initial LUT storage unit 302. In the present embodiment, an initial OPGLUT read from the initial LUT storage unit 302 has a linear conversion characteristic in which the input color material amount and the output color material amount are equal. In a case where the existing OPGLUT is stored in the OPGLUT storage unit 1502, the OPGLUT read from the OPGLUT storage unit 1502 may be selected.

In S1402, a target grid point p is selected from the grid points in the OPGLUT selected in S1401. The position of the start point (the input color material amount=the grid point of 0) and the end point (the input color material amount=the grid point of 255) in the OPGLUT are fixed, and in the present embodiment the grid point adjacent to the start point is first selected as the target grid point p. In S1402, all the grid points in the OPGLUT may be sequentially selected, or only some of the grid points may be set as the target of the optimization process. In a case where only some grid points are set as the target of the optimization process, the actual color material amount between the grid points can be calculated by a known spline interpolation method or the like.

In S1403, a parameter s is initialized. In the present embodiment, the parameter s indicates a variation range, and a value of the initialized parameter s is "8."

In S1404, the output color material amount at the target grid point p is varied on the basis of the initialized parameter s. Specifically, a process for adding the initialized parameter s and a process of subtracting the initialized parameter s are performed on the output color material amount at the target grid point p. Then, for the target grid point p, three types of intermediate LUTs, that is, L0 in which the output color material amount is not changed, L1 in which the parameter s is added to the output color material amount, and L2 in which the parameter s is subtracted from the output color material amount are generated.

In S1405, the actual color material amounts in the evaluation target line are calculated using the three types of intermediate LUTs generated in S1404 and the color separation LUT. In S1405, firstly, the input RGB signal value is converted into the actual color material amount through the color separation LUT, and then the actual color material amounts in the evaluation target line are converted through the three types of intermediate LUTs. As a result, three types of actual color material amounts corresponding to the three types of intermediate LUTs (L0 to L2) are acquired for one evaluation target line. The color separation LUT stored in the color separation LUT storage unit 104 is preferably used as the color separation LUT referred to in S1405, but the corrected color separation LUT described in the first embodiment may be referred to. In the present embodiment, unlike the first embodiment, the color separation LUT stored in the color separation LUT storage unit 104 and the corrected color separation LUT are three-dimensional color separation LUTs having 17×17×17 grid points.

In S1406, the actual color material amount in the evaluation target line is converted into the virtual color material amount. The conversion from the actual color material amount into the virtual color material amount can be executed in accordance with the technique of FIGS. 6A to 6C and Formulas (4-1) to (4-3). As a result of the conversion processing in S1406, three types of virtual color material amounts corresponding to the three types of intermediate LUTs (L0 to L2) are acquired.

In S1407, evaluation values E0, E1, and E2 are calculated for each of the three types of virtual color material amounts calculated in S1406. In the technique of calculating the evaluation values E0 to E2 on the basis of the virtual color material amount, for example, a maximum value of a value obtained by squaring the curvature of the virtual color material amount in the evaluation target line is used.

In S1408, the evaluation values E0 to E2 are compared with each other, and an intermediate LUT having the best evaluation value among the three types of intermediate LUTs (L0 to L2) is selected. Then, the initial OPGLUT is updated to the intermediate LUT having the best evaluation value.

In S1409, it is determined whether or not the evaluation value has converged. In the present embodiment, in a case where the evaluation value E0 corresponding to L0 in which the actual color material amount is not varied by the parameter s is calculated (S1407), the evaluation value is determined to have converged. In a case where the evaluation value has converged (S1409: YES), the process proceeds to S1410. In a case where the evaluation value has not converged (S1409: NO), the process returns to S1404.

In S1410, the value of the parameter s is updated. In the present embodiment, the value of the parameter s is updated to a value (for example, "4") obtained by dividing the current value of s (for example, "8") by 2.

In S1411, it is determined whether or not the value of s is less than 1.0. In a case where the value of s is 1.0 or more (S1411: NO), the process returns to 1404, and in a case where the value of s is less than 1.0 (S1411: YES), the process proceeds to S1412.

In S1412, it is determined whether or not the optimization process has been completed for all the grid points. In a case where the optimization process has not been completed for all the grid points (S1412: NO), the process returns to S1402, and in a case where the optimization process has been completed for all the grid points (S1412: YES), the process proceeds to S1413.

In S1413, it is determined whether or not the correction process has been completed for all types of OPGLUTs. In a case where the correction process has not been completed for all types of OPGLUTs (S1413: NO), the process returns to S1401, and in a case where the correction process has been completed for all types of OPGLUTs (S1413: YES), the process of the present flowchart ends.

Figure 17A:
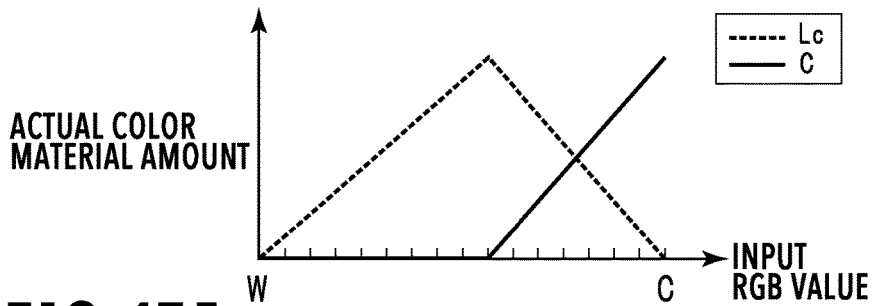
FIGS. 17A to 17D are diagrams describing an example in which an OPGLUT is corrected in the third embodiment.
Figure 17B:
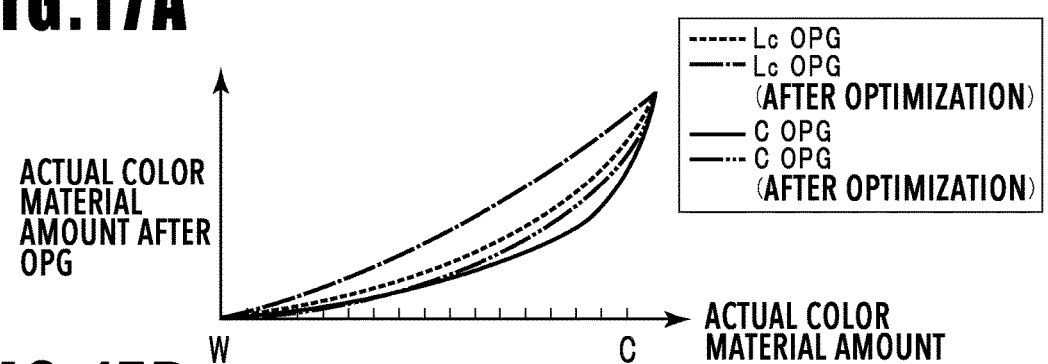
Figure 17C:
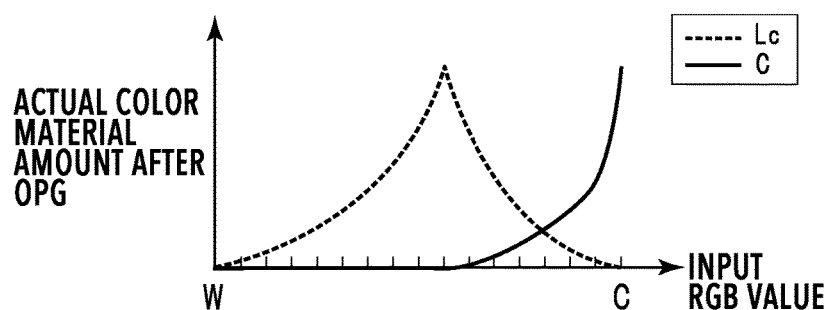
Figure 17D:
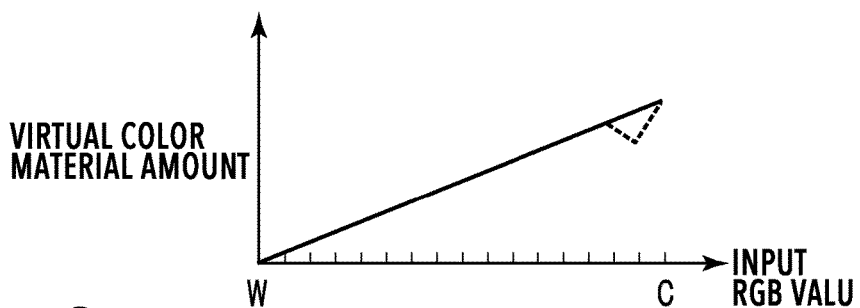

In the present embodiment, a specific example in which the OPGLUT is corrected on the basis of the virtual color material amount is illustrated in FIGS. 17A to 17D. FIG. 17A is a diagram illustrating a color conversion characteristic of a line W-C in the color separation LUT, similarly to FIG. 8A. A difference from the color separation LUT of FIG. 8A lies in that the number of grid points in the color separation LUT is thinned to 17×17×17. Accordingly, in the line W-C in FIG. 17A, the position of the inflection point coincides with the position of the grid point. FIG. 17B is a diagram illustrating OPGLUTs of the C ink and the Lc ink among the OPGLUTs illustrated in FIG. 16 in a superimposed manner. FIG. 17C is a diagram illustrating transition of the actual color material amount of the C ink and the actual color material amount of the Lc ink after the color conversion (FIG. 17A) which are converted by the OPGLUT (FIG. 17B). FIG. 17D is a diagram illustrating an example of the virtual color material amount converted from the actual color material amount in FIG. 17C. In the graph of FIG. 17D, a broken line indicates that the linearity of the color material amount of the actual C ink and the color material amount of the actual Lc ink collapses due to the conversion characteristic illustrated in FIG. 17B. Similarly to the first embodiment, since the linear relation is established between the actual color material amount and the virtual color material amount, even in a case where the linearity of the color material amount of the actual ink collapses due to the OPG process, an abrupt change of the color material amount can be indicated by the transition of the virtual color material amount. In the present embodiment, the process of optimizing the OPGLUT is executed by adjusting the output color material amount in the OPGLUT on the basis of the evaluation value while considering the characteristic of the virtual color material amount. The example of the OPGLUT of the actual C ink and the OPGLUT of the actual Lc ink optimized on the basis of evaluation value is illustrated in the graph of FIG. 17B.

As described above, according to the LUT correcting device 300 of the present embodiment, it is possible to evaluate the conversion characteristic of the one-dimensional non-linear conversion LUT which is referred to in the image processing other than the color separation process using the virtual color material amount. Further, it is possible to correct the conversion characteristic of the one-dimensional non-linear conversion LUT on the basis of the evaluation result.

Modified Examples

The above-described embodiment is an example, and the present embodiment can be applied to the following modified examples. In the present embodiment, the example in which the non-linear conversion process of the input RGB signal value is performed for each ink color has been described, but it may be a process common to the ink colors. The non-linear conversion parameter indicating the conversion characteristic from the input color material amount into the output color material amount may be in a form other than the one-dimensional non-linear conversion LUT and may be implemented by, for example, a matrix operation or a mathematical formula. In this case, in the correction process of the non-linear conversion parameter, coefficients in the matrix or coefficients in the mathematical formula are corrected.

Fourth Embodiment

Usually, in the three-dimensional color separation LUT which is referred to in the color separation process, in order to save a storage capacity thereof, the color material amount is stored only at the main grid points, and the color material amount between these grid points is calculated through the interpolation calculation. Therefore, in order to save the storage capacity of the color separation LUT, it is preferable to reduce the number of grid points within a range in which the color conversion characteristic is allowed. In the present embodiment, an example in which the conversion characteristic of the color separation LUT is evaluated using the virtual color material amount, and the initial color separation LUT is corrected to the color separation LUT having an appropriate number of grid points (the number of grids) on the basis of the evaluation result will be described. Hereinafter, description of parts common to those in the first to third embodiments will be simplified or omitted, and the following description will proceed focusing on points specific to the present embodiment.

(Color Separation LUT Correction Procedure)

Figure 18:
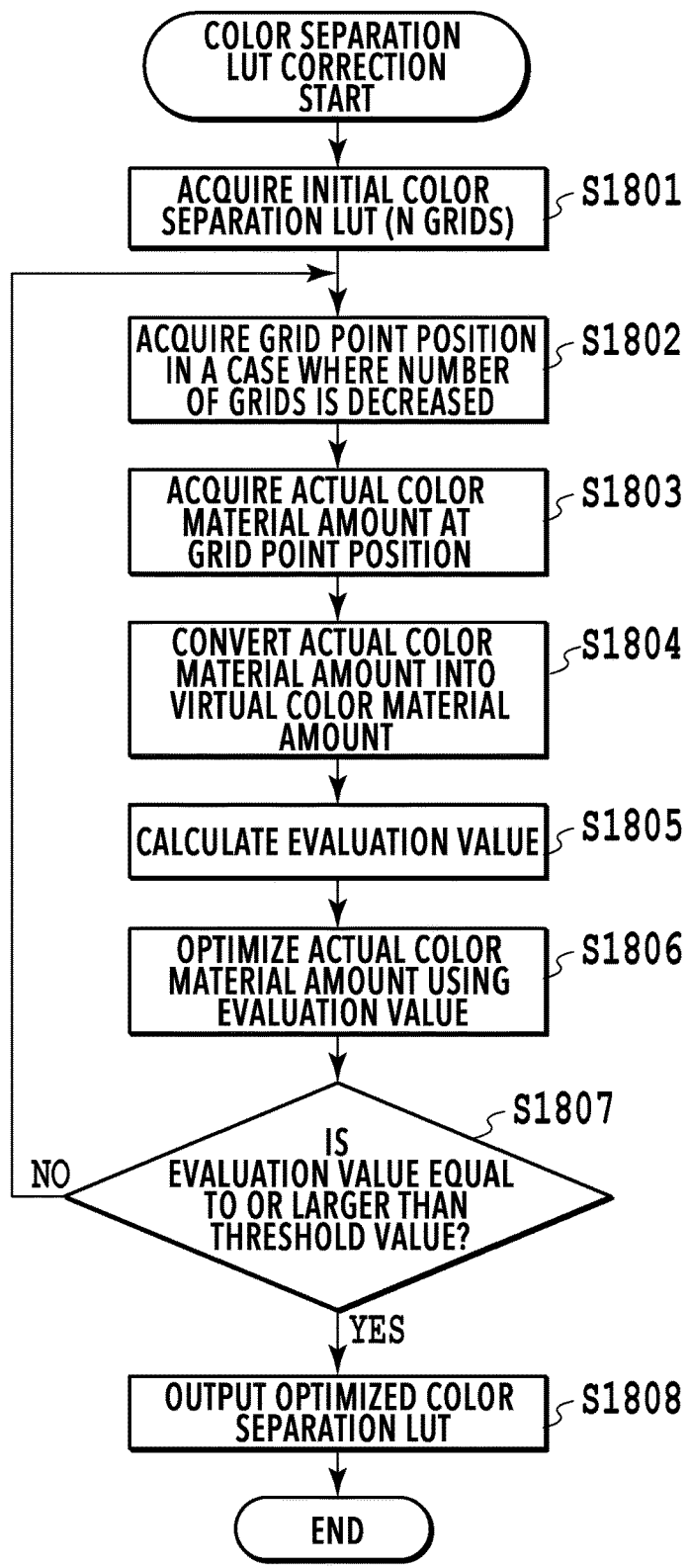
FIG. 18 is a flowchart illustrating a procedure of correcting a color separation LUT in a fourth embodiment.

A color separation LUT correction procedure in the present embodiment will be described with reference to a flowchart in FIG. 18. A process of the flowchart illustrated in FIG. 18 is executed by the LUT correcting unit 303 of the LUT correcting device 300.

In S1801, the initial color separation LUT is acquired. In the present embodiment, the initial color separation LUT which is generated by the LUT generating unit 301 and stored in the initial LUT storage unit 302 is read out. The initial color separation LUT generated by the technique described with reference to FIGS. 7A and 7B, and FIGS. 8A to 8C is read out, but the existing color separation LUT stored in the color separation LUT storage unit 104 may be acquired. In the present embodiment, a three-dimensional color separation LUT of 256 grids having 256×256×256 grid points is acquired.

In S1802, the grid point position in the color separation LUT in a case in which the number of grids is decreased is acquired. In the present embodiment, the number of grids "1" is gradually decreased each time a loop of S1802 to S1807 is executed.

In S1803, the actual color material amount at the grid point position acquired in S1802 is acquired. At this time, the LUT correcting unit 303 can acquire the actual color material amount corresponding to the input RGB signal value with reference to the initial color separation LUT. Further, in S1803, similarly to the second embodiment, a plurality of actual color material amounts in the evaluation target line are acquired.

In S1804, the actual color material amounts acquired in S1803 are converted into the virtual color material amounts. The conversion from the actual color material amount into the virtual color material amount can be executed in accordance with the technique of FIGS. 6A to 6C and Formulas (4-1) to (4-3).

In S1805, the evaluation value is calculated for the virtual color material amounts converted in S1804. In the technique of calculating the evaluation value using the virtual color material amount, a maximum value of a value obtained by squaring the curvature of the virtual color material amount in the evaluation target line to the power of 2 can be used, similarly to S1407 in the second embodiment.

In S1806, the actual color material amount at each grid point is optimized using the evaluation value calculated in S1805. Specifically, first, the virtual color material amount at each grid point is increased or decreased so that the evaluation value is decreased. Then, the increased or decreased virtual color material amount is converted into the actual color material amount again.

In S1807, it is determined whether or not the evaluation value calculated in S1805 is equal to or larger than a threshold value. In a case where the evaluation value is equal to or larger than the threshold value (S1807: YES), the process proceeds to S1808. In a case where the evaluation value is less than the threshold value (S1807: NO), the process returns to S1802. In this case, in S1802, the grid point position in the color separation LUT in a case in which the number of grids "1" is further reduced is acquired.

In the present embodiment, as the number of grids (the number of grid points) in the color separation LUT increases, the color conversion characteristic becomes more linear (for example, see FIG. 8A), and the evaluation value calculated in S1805 decreases. In a case where the number of grid points (the number of grid points) in the color separation LUT is reduced in S1802, the linearity of the actual color material amount collapses (for example, the "actual color material amount after thinning the grid point" in FIG. 11A), and the evaluation value calculated in S1805 increases. In the present embodiment, an allowable maximum evaluation value is set as the threshold value, and in a case where the evaluation value reaches the threshold value, the loop of S1802 to S1807 is exited.

In S1808, the optimized color separation LUT is output. In the optimized color separation LUT, the grid points corresponding to the number of grids reduced each time the loop of S1802 to S1807 is executed are thinned out from the initial color separation LUT. Further, in the optimized color separation LUT, the actual color material amount optimized (increased or decreased) in S1806 is stored at each thinned grid point. The color separation LUT optimized as described above is output to the color separation LUT storage unit 104 and referred to by the color separation processing unit 103.

As described above, according to the LUT correcting device 300 of the present embodiment, it is possible to evaluate the conversion characteristic of the color separation LUT in a case where the number of grids (the number of grid points) is reduced using the virtual color material amount. Further, the initial color separation LUT can be corrected to the color separation LUT having the appropriate number of grids (the number of grid points) on the basis of the evaluation result.

Modified Examples

The above-described embodiment is an example, and the present embodiment can be applied to the following modified examples. In the present embodiment, similarly to first embodiment, the example of optimizing the actual color material amount in the color separation LUT has been described, but similarly to the second and third embodiments, the grid point position in the non-linear conversion LUT or the OPGLUT may be set as the target of the optimization process. Further, the optimization processes may be combined. The number of grids (the number of grid points) in the color separation LUT may differ in accordance with each ink type.

Fifth Embodiment

In the first to fourth embodiments, the example in which the color conversion characteristic of the color separation LUT is evaluated using the virtual color material amount, and the color separation LUT or the like is corrected on the basis of the evaluation result has been described. In the present embodiment, an example in which a pixel whose actual color material amount is not smooth with respect to an input RGB value is detected using the virtual color material amount, and the detection result is presented to the user will be described. Hereinafter, description of parts common to those in the first to fourth embodiments will be simplified or omitted, and the following description will proceed focusing on points specific to the present embodiment.

(Overall Structure of Printing System)

Figure 19:
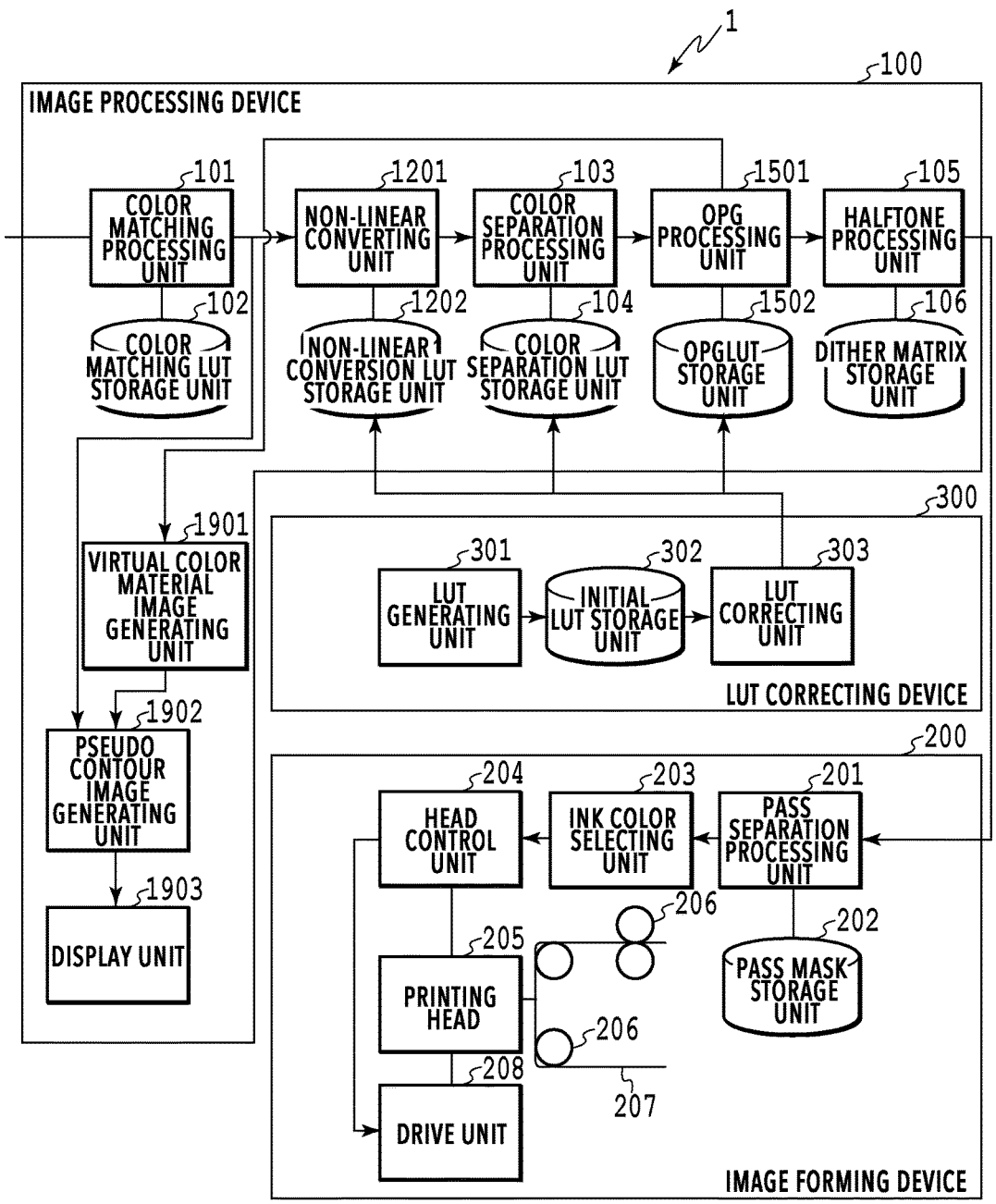
FIG. 19 is a block diagram illustrating an overall configuration example of a printing system in a fifth embodiment.

FIG. 19 is a block diagram illustrating an overall configuration example of a printing system 1 in the present embodiment. A difference from the printing system 1 of the third embodiment lies in that a virtual color material image generating unit 1901, a pseudo contour image generating unit 1902, and a display unit 1903 are added to the image processing device 100. The virtual color material image generating unit 1901 acquires an actual color material amount signal which is a signal indicating the actual color material amount output from the OPG processing unit 1501 and converts the acquired actual color material amount signal into a virtual color material amount signal indicating an amount of virtual color material. The "virtual color material amount" is similar to that in the first to fourth embodiments, and thus detailed description thereof is omitted. An example of the actual color material amount which has undergone the OPG process is similar to the example illustrated in FIG. 17C, and the conversion process from the actual color material amount signal into the virtual color material amount signal can be executed through the technique of FIGS. 6A to 6C and Formulas (4-1) to (4-3). The pseudo contour image generating unit 1902 generates a pseudo contour image signal on the basis of the RGB image signal which has undergone the color matching process and the virtual color material amount signal. Similarly to the display unit 315 in the LUT correcting device 300, the display unit 1903 is implemented by a liquid crystal display (LCD) or the like and displays a screen generated by a graphic controller.

(Pseudo Contour Image Generation Procedure)

Figure 20:
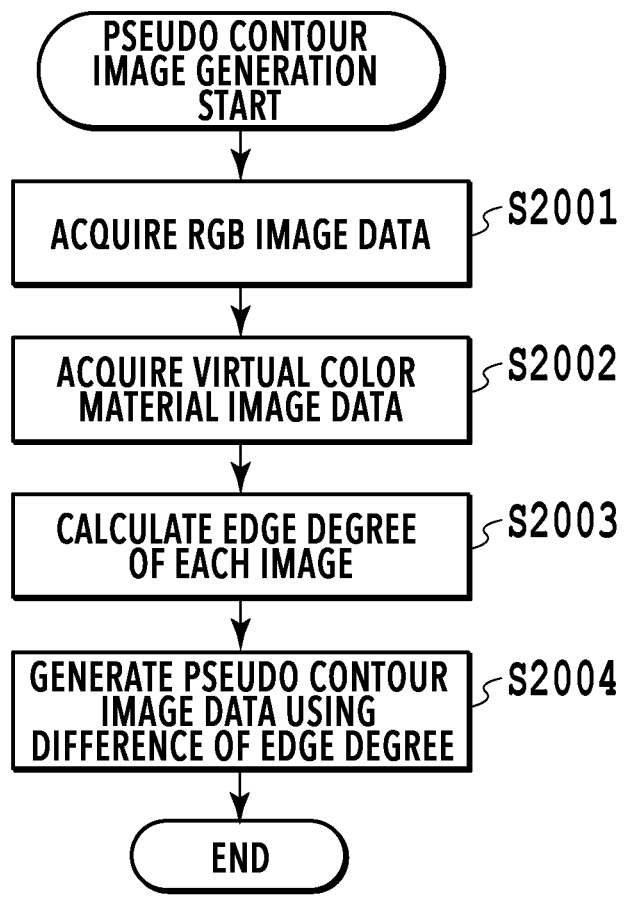
FIG. 20 is a flowchart illustrating a procedure of generating a pseudo contour image in the fifth embodiment.

Next, a pseudo contour image generation procedure in the present embodiment will be described with reference to the flowchart of FIG. 20. A process of the flowchart illustrated in FIG. 20 is executed by the pseudo contour image generating unit 1902 of image processing device 100 or the like.

In S2001, the RGB image data which has undergone the color matching process is acquired from the color matching processing unit 101.

In S2002, the virtual color material image data is acquired from the virtual color material image generating unit 1901. The virtual color material image is indicated by the virtual color material amount signal.

In S2003, an edge degree of each pixel is calculated for each piece of RGB image data acquired in S2001 and each piece of virtual color material image data acquired in S2002. The process of calculating the edge degree in the image data is performed by performing a filtering process using a known Laplacian cyan filter.

In S2004, pseudo contour image data is generated on the basis of a difference in the edge degree calculated in S2003. In the present embodiment, after an average and a variance of the edge degree of each pixel are normalized, a difference in the edge degree in a corresponding pixel between the RGB image data and the virtual color material image data is calculated, and thus the pseudo contour image data is generated. A pseudo contour image indicated by the pseudo contour image data is displayed on the display unit 1903.

Figure 21:
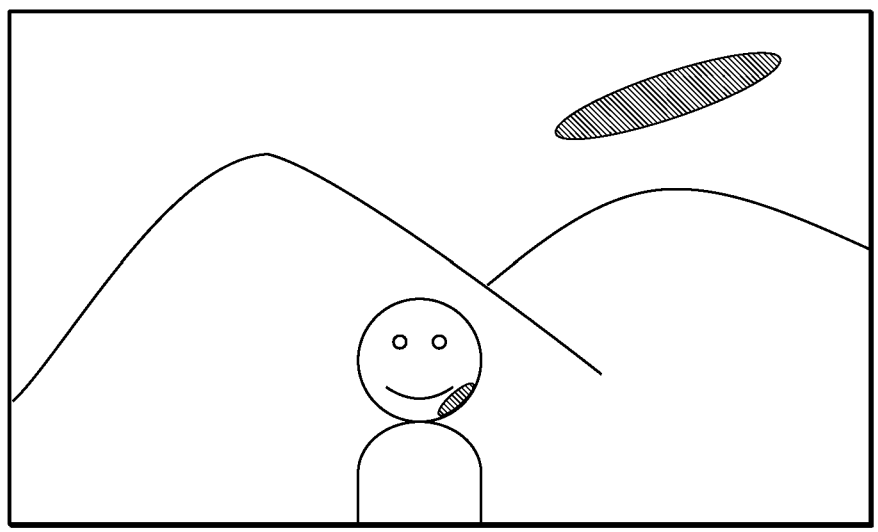
FIG. 21 illustrates an example of the pseudo contour image in the fifth embodiment.

FIG. 21 is a diagram schematically illustrating the pseudo contour image displayed on the display unit 1903. In the pseudo contour image illustrated in FIG. 21, a hatched region indicates a region in which the difference in the edge degree between the RGB image and the virtual color material image is large. In the region in which the difference in the edge degree between the RGB image and the virtual color material image is large, a possibility of the occurrence of an abrupt change in the color material amount is high, and a defect such as a pseudo contour is likely to occur in a printed image. In the present embodiment, the pseudo contour image is generated, and a region in which the defect such as the pseudo contour is likely to occur in the generated pseudo contour image is displayed on the display unit 1903 in a form which the user can identify (for example, a pixel of a region in which a defect is likely to occur is colored). The user can recognize a color in which a problem is highly likely to occur in the gradation property, for example, in the color conversion process by checking the pseudo contour image illustrated in FIG. 21.

As described above, in the present embodiment, the pixel whose actual color material amount is not smooth with respect to the input RGB value is detected using the virtual color material amount, and a detection result is presented to the user. With such a configuration, the user can recognize a color in which a problem is highly likely to occur in the gradation property in the color conversion process.

Modified Examples

The above-described embodiment is an example, and the present embodiment can be applied to the following modified example. In the present embodiment, the example in which the pseudo contour image is displayed on the display unit has been described, but the displayed image may be an image other than the pseudo contour image. For example, an image indicated by the RGB image data which has undergone the color matching and an image indicated by the virtual color material image data may be displayed on the display unit side by side.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention has an effect in that it is possible to further improve the gradation property implemented by the color conversion look-up table.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091872, filed May 2, 2017, which is hereby incorporated by reference wherein in its entirety.

What is claimed is:

1. A color conversion look-up table generating device used in a color conversion process of converting a signal value in an input image into a plurality of types of actual color material values, comprising:
one or more processors; and
a memory storing instructions which, when the instructions are executed by the one or more processors, cause the generating device to:
acquire an actual color material value of a target grid point in the color conversion look-up table and an actual color material value of a neighbor grid point of the target grid point;
convert the actual color material value of the target grid point and the actual color material value of the neighbor grid point of the target grid point into virtual color material values;
correct the actual color material value of the target grid point on the basis of a virtual color material amount of the target grid point and a virtual color material amount of the neighbor grid point;
calculate an evaluation value for the actual color material value of the target grid point on the basis of the virtual color material amount of the target grid point and the virtual color material amount of the neighbor grid point, wherein the virtual color material value is an output value of a virtual color material that absorbs only light of spectral reflectance in each of is divided blocks in a case in which spectral reflectance of the actual color material divided into n (n is an integer of 3 or more) blocks; and
correct the actual color material value of the target grid point on the basis of the evaluation value.

2. The generating device according to claim 1, wherein the memory has further instructions stored thereon which, when executed by the one or more processors, cause the generating device to correct the actual color material value of the target grid point so that the virtual color material amount of the target grid point and the virtual color material amount of the neighbor grid point change in a uniform manner.

3. The generating device according to claim 1, wherein the memory has further instructions stored thereon which, when executed by the one or more processors, cause the generating device to correct a position of the target grid point on the basis of the virtual color material amount of the target grid point and the virtual color material amount of the neighbor grid point.

4. The generating device according to claim 1, wherein the evaluation value is a value indicating smoothness of a change between the virtual color material amount of the target grid point and the virtual color material amount of the neighbor grid point.

5. The generating device according to claim 4, wherein the smoothness of the change is linearity of the change of the virtual color material value or the actual color material value at the target grid point or linearity of an arrangement of the target grid point.

6. The generating device according to claim 4, wherein the smoothness of the change is a curvature of the virtual color material value or the actual color material value at the target grid point.

7. The generating device according to claim 4, wherein the smoothness of the change is a sum of displacement vectors connecting the target grid point and the neighbor grid point.

8. The generating device according to claim 1, wherein the memory has further instructions stored thereon which, when executed by the one or more processors, cause the generating device to further:
convert non-linearly a signal value in the input image into a second signal value used as an input value of the color conversion look-up table;
correct a non-linear conversion parameter used in the non-linear conversion;
calculate a plurality of evaluation values using a plurality of virtual color material values obtained by converting a plurality of actual color material values in a case where the second signal value is caused to vary; and
correct the non-linear conversion parameter so that the signal value in the input image is converted into the second signal value corresponding to a best evaluation value among the plurality of evaluation values.

9. The generating device according to claim 8, wherein the non-linear conversion parameter is a one-dimensional non-linear conversion LUT used in the non-linear conversion.

10. The generating device according to claim 8, wherein there is the non-linear conversion parameter for each of the plurality of types of actual color materials.

11. The generating device according to claim 1, wherein the memory has further instructions stored thereon which, when executed by the one or more processors, cause the generating device to further:
convert non-linearly the actual color material value converted using the color conversion look-up table into a second actual color material value;
correct a second non-linear conversion parameter used in the non-linear conversion;
calculate a plurality of evaluation values using a plurality of the virtual color material values obtained by converting a plurality of second actual color material values in a case where the actual color material value is caused to vary; and
correct the second non-linear conversion parameter so that the actual color material value is converted into the second actual color material value corresponding to a best evaluation value among the plurality of evaluation values.

12. The generating device according to claim 11, wherein the second non-linear conversion parameter is a one-dimensional non-linear conversion LUT used in an OPG process.

13. The generating device according to claim 11, wherein there is the second non-linear conversion parameter for each of the plurality of types of actual color materials.

14. The generating device according to claim 1, wherein the memory has further instructions stored thereon which, when executed by the one or more processors, cause the generating device to:
decide the number of grid points in the color conversion look-up table on the basis of the evaluation value.

15. The generating device according to claim 14, wherein the memory has further instructions stored thereon which, when executed by the one or more processors, cause the generating device to calculate the evaluation value using the virtual color material value obtained by converting the actual color material value in a case where the grid point in the color conversion look-up table is reduced; and decide the number of grid points in the color conversion look-up table as the number of the grid points corresponding to the evaluation value in a case where the evaluation value is equal to or larger than a predetermined threshold value.

16. The generating device according to claim 14, wherein the memory has further instructions stored thereon which, when executed by the one or more processors, cause the generating device to decide the number of grid points in the color conversion look-up table for each of the plurality of types of actual color materials.

17. The generating device according to claim 1, wherein there are n types of virtual color materials corresponding to the n divided blocks, and n is smaller than the number of types of the actual color material value.

18. A color conversion look-up table correction method used in a color conversion process of converting a signal value in an input image into a plurality of types of actual color material values, comprising:
   an acquisition step of acquiring an actual color material value of a target grid point in the color conversion look-up table and an actual color material value of a neighbor grid point of the target grid point;
   a conversion step of converting the actual color material value of the target grid point and the actual color material value of the neighbor grid point of the grid point into virtual color material values;
   a correction step of correcting the actual color material value of the target grid point on the basis of a virtual color material amount of the target grid point and a virtual color material amount of the neighbor grid point; and
   a calculating step of calculating an evaluation value for the actual color material value of the target grid point on the basis of the virtual color material amount of the target grid point and the virtual color material amount of the neighbor grid point, wherein the virtual color material value is an output value of a virtual color material that absorbs only light of spectral reflectance in each of divided blocks in a case in which spectral reflectance of the actual color material is divided into n (n is an integer of 3 or more) blocks, and
   wherein the correcting step corrects the actual color material value of the target grid point on the basis of the evaluation value.

19. A non-transitory computer readable storage medium storing a program for causing a computer to execute a color conversion look-up table correction method used in a color conversion process of converting a signal value in an input image into a plurality of types of actual color material values,
   wherein the color conversion look-up table generating method comprises:
      acquiring an actual color material value of a target grid point in the color conversion look-up table and an actual color material value of a neighbor grid point of the target grid point;
      converting the actual color material value of the target grid point and the actual color material value of the neighbor grid point of the target grid point into virtual color material values;
      correcting the actual color material value of the target grid point on the basis of a virtual color material amount of the target grid point and a virtual color material amount of the neighbor grid point;
      calculating an evaluation value for the actual color material value of the target grid point on the basis of the virtual color material amount of the target grid point and the virtual color material amount of the neighbor grid point, wherein the virtual color material value is an output value of a virtual color material that absorbs only light of spectral reflectance in each of divided blocks in a case in which spectral reflectance of the actual color material is divided into n (n is an integer of 3 or more) blocks; and
      correcting the actual color material value of the target grid point on the basis of the evaluation value.

* * * * *